(12) United States Patent
Seto

(10) Patent No.: US 9,069,542 B2
(45) Date of Patent: Jun. 30, 2015

(54) POWER CONSUMPTION AMOUNT MANAGEMENT SYSTEM FOR MANAGING POWER CONSUMPTION AMOUNT, POWER CONSUMPTION MANAGEMENT METHOD, AND STORAGE MEDIUM

(75) Inventor: Hidekazu Seto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 13/554,256

(22) Filed: Jul. 20, 2012

(65) Prior Publication Data

US 2013/0031385 A1    Jan. 31, 2013

(30) Foreign Application Priority Data

Jul. 27, 2011    (JP) .................. 2011-164431

(51) Int. Cl.
| | |
|---|---|
| G06F 1/26 | (2006.01) |
| G06F 1/32 | (2006.01) |
| G06F 1/28 | (2006.01) |
| G06F 3/12 | (2006.01) |
| G06F 11/00 | (2006.01) |

(52) U.S. Cl.
CPC ............... *G06F 1/28* (2013.01); *G06F 3/1259* (2013.01); *G06F 3/126* (2013.01); *G06F 1/3203* (2013.01); *G06F 11/008* (2013.01); *G06F 3/1284* (2013.01); *G06F 3/1218* (2013.01); *G06F 3/1221* (2013.01)

(58) Field of Classification Search
CPC ....... G06F 1/28; G06F 1/3203; G06F 3/1218; G06F 3/1221; G06F 3/1259; G06F 3/126; G06F 3/1284; G06F 11/008

USPC .................. 713/300, 320, 340; 358/1.14
See application file for complete search history.

(56) References Cited

U.S. PATENT DOCUMENTS

2011/0235108 A1 *    9/2011    Kato ........................ 358/1.15

FOREIGN PATENT DOCUMENTS

| | | |
|---|---|---|
| JP | 2003-335026 | 11/2003 |
| JP | 2010-072870 | 4/2010 |

* cited by examiner

*Primary Examiner* — Michael J Brown
(74) *Attorney, Agent, or Firm* — Carter, DeLuca, Farrell & Schmidt, LLP

(57) ABSTRACT

A power consumption amount management system which is capable of appropriately managing the amount of power consumption according to the situation. In the power consumption amount management system, an image forming apparatus and a power consumption management server are connected to a network. An electric power measurement section in the image forming apparatus measures the amount of electric power consumed by the apparatus. A measurement error determination section determines whether or not measurement of the power consumption amount is successful. An interface section outputs a notification of information on the power consumption amount measured in the image forming apparatus and a result of the determination. The power consumption management server receives the notification from the image forming apparatus, and corrects the information on the power consumption amount in the image forming apparatus by referring to the result of the determination.

8 Claims, 20 Drawing Sheets

FIG.9A

| 601 OPERATION HISTORY RECORD ID | 602 USER NAME | 603 OPERATION TYPE | 604 START TIME | 605 END TIME | 606 COLOR PAGE COUNT | 607 MONOCHROME PAGE COUNT | 608 SCANNED PAGE COUNT | 609 POWER CONSUMPTION AMOUNT | 610 MEASUREMENT ERROR ATTRIBUTE |
|---|---|---|---|---|---|---|---|---|---|
| 1000 | USER 1 | COPY | 2010/6/2 18:33 | 2010/6/2 18:50 | 10 | 0 | 10 | 100 | 0 |
| 1001 | NON-USER | STANDBY | 2010/6/2 18:51 | 2010/6/2 19:21 | 0 | 0 | 0 | 50 | 0 |
| 1002 | NON-USER | SLEEP | 2010/6/2 19:22 | 2010/6/3 9:14 | 0 | 0 | 0 | 20 | 0 |
| 1003 | USER 2 | SCAN | 2010/6/3 9:15 | 2010/6/3 9:15 | 0 | 0 | 3 | 150 | 0 |
| 1004 | USER 1 | PRINT | 2010/6/3 9:16 | 2010/6/3 9:19 | 0 | 3 | 0 | 0 | 1 |
| 1005 | USER 3 | PRINT | 2010/6/3 9:20 | 2010/6/3 9:23 | 1 | 0 | 0 | 0 | 1 |

FIG.9B

| OPERATION HISTORY RECORD ID 601 | USER NAME 602 | OPERATION TYPE 603 | START TIME 604 | END TIME 605 | COLOR PAGE COUNT 606 | MONOCHROME PAGE COUNT 607 | SCANNED PAGE COUNT 608 | POWER CONSUMPTION AMOUNT 609 | MEASUREMENT ERROR ATTRIBUTE 610 |
|---|---|---|---|---|---|---|---|---|---|
| 2000 | NON-USER | STANDBY | 2010/6/2 18:00 | 2010/6/2 19:00 | 0 | 0 | 0 | 100 | 0 |
| 2001 | NON-USER | SLEEP | 2010/6/2 19:01 | 2010/6/3 9:00 | 0 | 0 | 0 | 20 | 0 |
| 2002 | USER 11 | COPY | 2010/6/3 9:01 | 2010/6/3 9:03 | 10 | 0 | 10 | 1000 | 0 |
| 2003 | USER 13 | PRINT | 2010/6/3 9:04 | 2010/6/3 9:07 | 1 | 0 | 0 | 500 | 0 |
| 2004 | NON-USER | STANDBY | 2010/6/3 9:08 | 2010/6/3 9:38 | 0 | 0 | 0 | 50 | 0 |
| 2005 | USER 12 | SCAN | 2010/6/3 9:39 | 2010/6/3 9:39 | 0 | 0 | 3 | 150 | 0 |

FIG.13A

| APPARATUS ID | UPDATE TIME | FUNCTION ID | OPTION 1 | OPTION 2 | OPTION 3 | OPTION 4 |
|---|---|---|---|---|---|---|
| IMAGE FORMING APPARATUS 100 | 2010/1/1 8:30 | A | FINISHER X | — | — | — |
| IMAGE FORMING APPARATUS 101 | 2010/2/1 8:00 | A | FINISHER X | — | — | — |
| IMAGE FORMING APPARATUS 102 | 2010/3/1 9:30 | B | FINISHER X | SHEET DISCHARGE UNIT Z | — | — |
| ... | | | | | | |

| OPTION ID | SHEET SIZE: A4 (Wh/PAGE) | SHEET SIZE: A3 (Wh/PAGE) |
|---|---|---|
| SHEET DISCHARGE UNIT Y | 0.5 | 1 |
| SHEET DISCHARGE UNIT Z | 0.6 | 1.1 |
| FINISHER X | 1 | 1.5 |
| ... | | |

| APPARATUS ID | FIRST PRINT PAGE (Wh) | COLOR PRINTING (Wh/PAGE) | MONOCHROME PRINTING (Wh/PAGE) | SCAN (Wh/PAGE) |
|---|---|---|---|---|
| IMAGE FORMING APPARATUS 100 | 2 | 1 | 1.5 | 0.2 |
| IMAGE FORMING APPARATUS 101 | 2 | 1 | 1.5 | 0.2 |
| IMAGE FORMING APPARATUS 102 | 4 | 2 | 3 | 0.2 |
| ... | | | | |

FIG.13D

| APPARATUS ID | STANDBY MODE | SLEEP MODE | DURING PRINT JOB | DURING SCAN JOB |
|---|---|---|---|---|
| IMAGE FORMING APPARATUS 100 | 100 | 1 | 1000 | 100 |
| IMAGE FORMING APPARATUS 101 | 130 | 3 | 1200 | 120 |
| IMAGE FORMING APPARATUS 102 | 120 | 1 | 1100 | 110 |
| ... | | | | |

POWER CONSUMPTION AMOUNT MANAGEMENT SYSTEM FOR MANAGING POWER CONSUMPTION AMOUNT, POWER CONSUMPTION MANAGEMENT METHOD, AND STORAGE MEDIUM

BACKGROUND OF THE INVENTION

1. Field of the Invention

The present invention relates to a power consumption amount management system for calculating and managing the amount of electric power consumed by a device, a power consumption management method, and a storage medium.

2. Description of the Related Art

In recent years, reduction of the amount of electric power consumed during the use of an apparatus or device, such as a printer or a multifunction peripheral, has been demanded so as to reduce greenhouse gases including carbon dioxide. For this reason, there is a demand that the amount of electric power consumed during the use of the device is made visible to a user (so-called visualization).

In general, there is employed a system in which a plurality of copying machines (image forming apparatuses) each capable of measuring the amount of power consumption and a management apparatus for managing the copying machines are connected to a network. In such a conventional system, each of the copying machines outputs data concerning the amount of power consumption measured thereby in response to a request from the management apparatus (see e.g. Japanese Patent Laid-Open Publication No. 2003-335026 (page 6, FIG. 2)). This type of system enables the management apparatus to grasp, for example, month-by-month records of power consumption histories of the respective copying machines in a centralized manner.

Further, conventionally, a system is employed in which a plurality of apparatuses and a power consumption calculation device are connected to a network. In this type of system, the power consumption calculation device receives power consumption amount information from an apparatus capable of measuring the amount of power consumption and applies the received power consumption amount information to calculation (estimation) of the amount of power consumption by another apparatus (see e.g. Japanese Patent Laid-Open Publication No. 2010-072870 (page 6, FIG. 1)).

However, in the above-mentioned conventional systems, when a power consumption calculation section is faulty, it is impossible to appropriately manage power consumption amount information on target devices or apparatuses. For example, in the conventional systems, data on the amount of power consumption to be measured during a period up to completion of repair of the power consumption calculation section by part replacement and adjustment can be lost. Further, if the power consumption calculation section is removed, or if a power meter is defective in characteristics, or if a malfunction in which a specific range of output is abnormal is caused due to aging, it is impossible to appropriately manage the power consumption amount information. Therefore, in the conventional systems, it is difficult to perform detailed management of power consumption amount information and make wide use of the same.

SUMMARY OF THE INVENTION

The present invention provides a power consumption amount management system that is capable of appropriately managing the amount of power consumption according to a situation, when a measurement section for measuring the amount of power consumption consumed by a device is incapable of measuring the amount of electric power, a power consumption management method, and a storage medium.

In a first aspect of the present invention, there is provided a power consumption amount management system in which a device and a management apparatus for managing the device are connectable to a network, comprising a measurement unit configured to measure a power consumption amount of the device, a determination unit configured to determine whether or not measurement of the power consumption amount by the measurement unit is successful, a notification unit configured to send notification of information on the power consumption amount measured by the measurement unit and a result of the determination performed by the determination unit to the management apparatus, a reception unit configured to receive the notification sent by the notification unit from the device, and a correction unit configured to correct the information on the power consumption amount by referring to the result of the determination received by the power consumption amount history reception unit.

In a second aspect of the present invention, there is provided a method of managing power consumption of a device in a power consumption amount management system in which the device and a management apparatus for managing the device are connectable to a network, comprising measuring a power consumption amount of the device, determining whether or not measurement of the power consumption amount is successful, sending notification of information on the measured power consumption amount and a result of the measurement to the management apparatus, receiving the notification from the device, and correcting the information on the power consumption amount by referring to the received result of the determination.

In a second aspect of the present invention, there is provided a non-transitory storage medium storing a computer-readable program for causing a computer to execute a method of managing power consumption of a device in a power consumption amount management system in which the device and a management apparatus for managing the device are connectable to a network, wherein the method comprises measuring a power consumption amount of the device, determining whether or not measurement of the power consumption amount is successful, sending notification of information on the measured power consumption amount and a result of the measurement to the management apparatus, receiving the notification from the device, and correcting the information on the power consumption amount by referring to the received result of the determination.

According to the present invention, it is possible to construct a power consumption amount management system which makes it possible to appropriately estimate or calculate the amount of electric power consumed by a device even when the power consumption amount measurement device becomes incapable of measuring the amount of power consumption. Further, in the power consumption amount management system, even when a malfunction in which a specific range of output is abnormal occurs, it is possible to obtain more reliable power consumption history information by using an actual measured value within a normal range whenever possible. Furthermore, in the power consumption amount management system configured as above, it is possible to execute appropriate power consumption management using both an estimated value and an actual measured value of the amount of power consumption.

Further features of the present invention will become apparent from the following description of exemplary embodiments with reference to the attached drawings.

BRIEF DESCRIPTION OF THE DRAWINGS

FIGS. 9A and 9B are operation history information tables for use in the power consumption amount management system according to the first embodiment.

FIGS. 13A, 13B, 13C, and 13D are tables showing device configuration information for use in the power consumption amount management system according to the first embodiment.

DESCRIPTION OF THE EMBODIMENTS

The present invention will now be described in detail below with reference to the accompanying drawings showing embodiments thereof.

Figure 1:
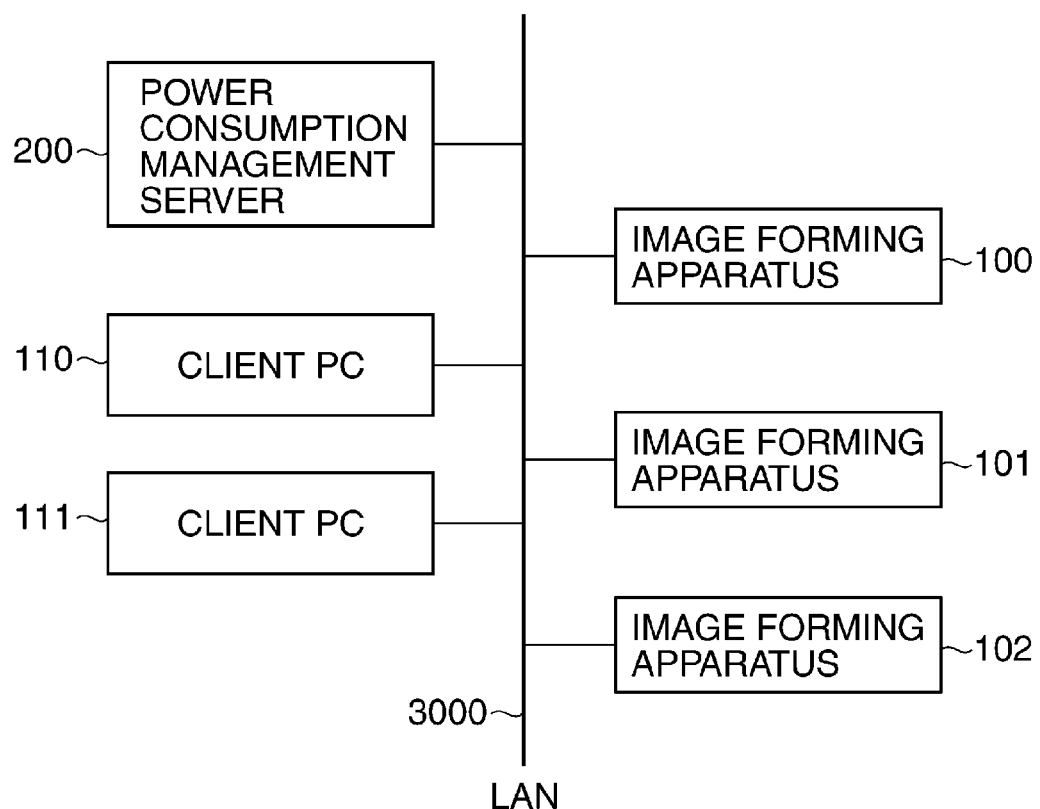
FIG. 1 is a block diagram of a network system that manages the power consumption amount of an image forming apparatus, as a power consumption amount management system according to a first embodiment of the present invention.

FIG. 1 is a block diagram of a network system as a power consumption amount management system according to a first embodiment of the present invention. The power consumption amount management system mainly manages the amount of power consumption by each image forming apparatus. Reference numerals 100, 101, and 102 denote image forming apparatuses, respectively. Each of the image forming apparatuses 100, 101, and 102 is implemented e.g. by a printer, a multifunction peripheral, or a facsimile machine.

This network system includes client PCs 110 and 111 capable of transmitting print data to the image forming apparatuses 100, 101, and 102, and a power consumption management server 200. The power consumption management server 200 manages the amount of power consumption by each of network apparatuses including the image forming apparatuses 100, 101, and 102. The client PCs 110 and 111, the image forming apparatuses 100, 101, and 102, and the power consumption management server 200 are communicably connected to each other by a LAN 3000.

The power consumption management server 200 receives information recording operational conditions (hereinafter referred to as "operation history information") from each of the image forming apparatuses 100, 101, and 102. This operation history information includes information concerning execution of operations of an image forming apparatus, such as information that makes it possible to determine who used the image forming apparatus, when and how. For example, when the image forming apparatus 100 executes a print command received from the client PC 110, history information concerning job type, print sheet count, setting of single-sided printing or double-sided printing, recording sheet size, etc. is recorded as operation history information. Further, in the present embodiment, information concerning the amount of electric power consumed by an image forming apparatus during execution of an operation accompanies the operation history information.

As described above, the power consumption management server 200 is configured to manage received operation history information and accompanying power consumption amount information, to thereby function as a power consumption management server for each apparatus on the network.

Next, the whole arrangement of an image forming apparatus will be described with reference to FIG. 2. The following description is given of the image forming apparatus 100, but the image forming apparatuses 101 and 102 may be configured similarly to the image forming apparatus 101.

Figure 2:
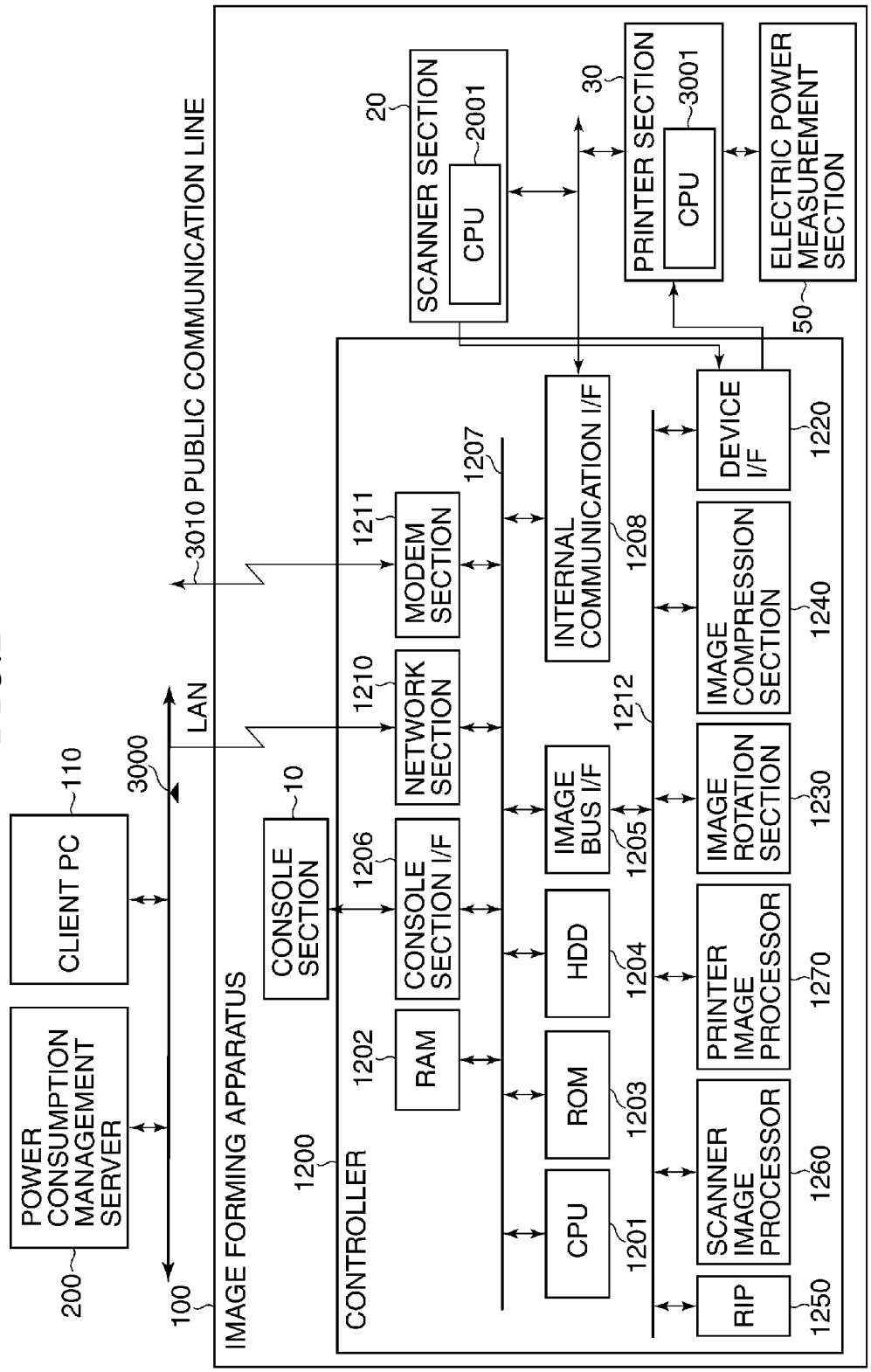
FIG. 2 is a schematic block diagram of the whole arrangement of an image forming apparatus appearing in FIG. 1.

FIG. 2 shows the image forming apparatus 100 included in the network system in FIG. 1, which is capable of calculating or measuring the amount of power consumption. Referring to FIG. 2, reference numeral 10 denotes a console section operated for various purposes by a user who uses the image forming apparatus 100. The image forming apparatus 100 comprises a scanner section 20 for reading image information according to an instruction from the console section 10, and a printer section 30 for printing an image on a sheet based on image data. The scanner section 20 includes a CPU 2001 for controlling the scanner section 20, and an illuminating lamp and scanning mirrors, neither of which is shown, for reading an original. On the other hand, the printer section 30 comprises a CPU 3001 for controlling the printer section 30 and a photosensitive drum and a fixing device, neither of which is shown, for forming an image and fixing the same, respectively.

The image forming apparatus 100 is provided with an electric power measurement section 50 for measuring the amount of power consumption. The image forming apparatus 100 is connected to the LAN 3000 and a public communication line (WAN) 3010. Further, the image forming apparatus 100 has a controller 1200 performs centralized control of the overall operation of the image forming apparatus 100. The controller 1200 controls input and output of image information, device information, information concerning the amount of power consumption, and so forth.

Next, the controller 1200 will be described in more detail with reference to FIG. 2. A raster image processor (RIP) 1250 converts a PDL code contained in a print job received from the client PC 110 via the LAN 3000 to a bitmap image, and a scanner image processor 1260 corrects, processes, and edits image data received from the scanner section 20.

A printer image processor 1270 performs correction, resolution conversion, and so forth on image data to be output (printed) by the printer section 30. An image rotation section 1230 rotates image data. An image compression section 1240 converts multivalued image data to JPEG data binary image data to JBIG data, and compresses or expands data by MMR (modified READ) or MH (modified huffman).

A device interface 1220 connects between the scanner section 20 and the printer section 30, and the controller 1200, and performs synchronous-asynchronous conversion of image data. An image bus 1212 connects between the above-mentioned devices for high-speed transfer of image data. A CPU 1201 as a control unit performs centralized control of the image forming apparatus 100. A RAM 1202 functions not only as a system work memory used by the CPU 1201 for operation, but also as an image memory for temporarily storing image data.

A console section interface 1206 outputs to the console section 10 image data to be displayed thereon. The console section interface 1206 plays the role of transferring to the CPU 1201 information input via the console section 10 by a user who uses the present image forming apparatus.

A network section 1210 is connected to the LAN 3000. The controller 1200 performs communication with (data transmission or reception to and from) the power consumption management server 200, the client PC 110, and other computer terminals, not shown, via the network section 1210.

The controller 1200 is configured to performs data communication with (data transmission or reception to and from) an external facsimile machine, not shown, via a modem section 1211 connected to the public communication line 3010.

A ROM 1203 stores a boot program executed by the CPU 1201. A HDD (hard disk drive) 1204 stores system software, image data, software counter values, predicted values of the amount of power consumption, and so forth. An internal communication interface 1208 performs communication with each of the scanner section 20 and the printer section 30, and a system bus 1207 connects between the sections of the controller 1200. An image bus interface 1205, which is a bus bridge that converts data structure, is provided to connect between the system bus 1207 and the image bus 1212.

Figure 3:
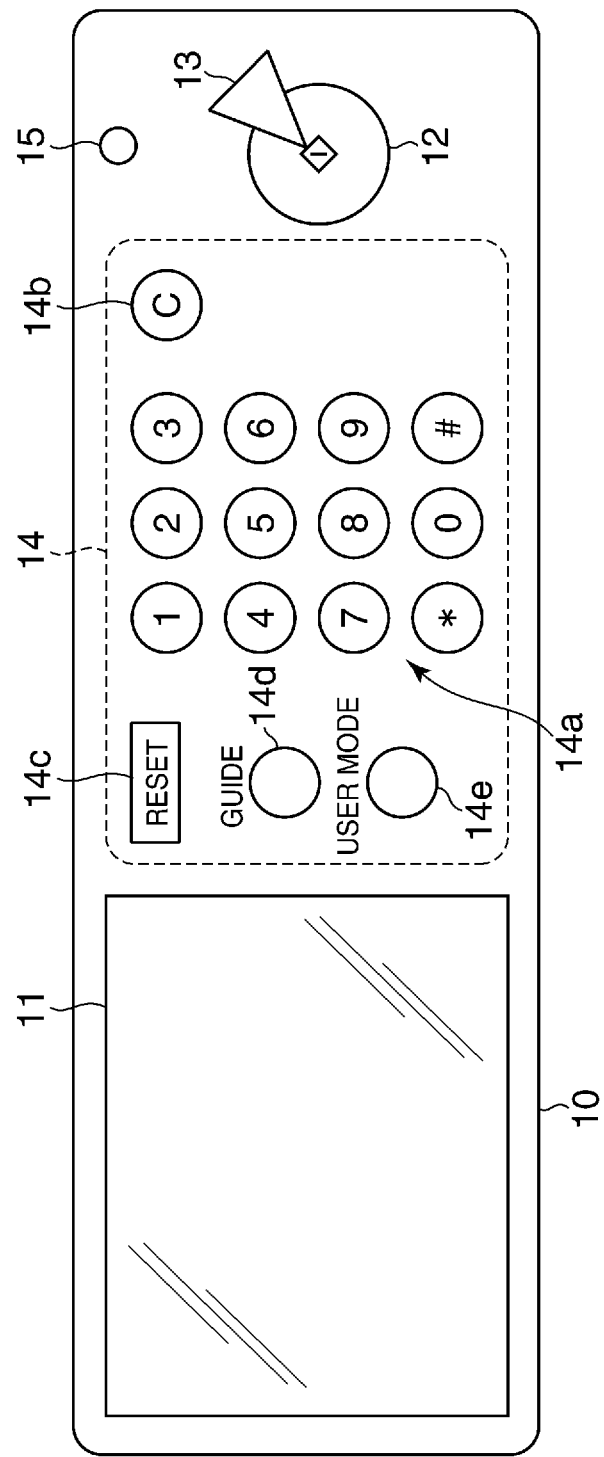
FIG. 3 is a front view of a console section of the image forming apparatus shown in FIG. 2.

Next, a description will be given of the console section of the image forming apparatus according to the present embodiment. FIG. 3 is a front view of essential parts of the console section of the image forming apparatus. The console section 10 shown in FIG. 3 has a liquid crystal operation panel 11. The liquid crystal operation panel 11 is formed by a combination of liquid crystal and a touch panel. The liquid crystal operation panel 11 is configured to display an operation screen. When a display key on the displayed operation panel is pressed by the user, the liquid crystal operation panel 11 detects the user's depressing operation and sends an information signal indicative of the operation to the controller 1200.

A start key 12 on the liquid crystal operation panel 11 is used to input an instruction for starting reading and printing of an original image and instructions for staring respective other functions. The start key 12 incorporates green and red LEDs, and the green LED illuminates to indicate that it is possible to start a predetermined operation, and the red LED illuminates to indicate that it is impossible to start a predetermined operation.

A stop key 13 on the liquid crystal operation panel 11 is used to input an instruction for stopping an operation being executed. A hard key group 14 provided on the liquid crystal operation panel 11 includes ten keys 14a, a clear key 14b, a reset key 14c, a guide key 14d, and a user mode key 14e. A power saving key 15 on the liquid crystal operation panel 11 enables an instruction for shifting or returning the image forming apparatus to or from a sleep mode to be input via the console section 10.

In the image forming apparatus, when the power saving key 15 is pressed by the user during operation in a normal mode, the normal mode is switched to the sleep mode, whereas when the power saving key 15 is pressed by the user in the sleep mode, the sleep mode is switched to the normal mode.

The console section 10 sends information necessary for generation of operation information, such as a user name, a print/copy sheet count, and output attribute information, which are input by the user, to the console section interface 1206 via the liquid crystal operation panel 11.

Next, a description will be given of a print process executed by the image forming apparatus 100 configured as described hereinabove with reference to FIG. 2.

The image forming apparatus 100 receives a print job sent from the client PC 110 connected to the LAN 3000, and based on the print job, executes the print process as follows: In the image forming apparatus 100, when print data as image data for printing is received from the client PC 110 via the network section 1210, the CPU 1201 causes the RAM 1202 to store the received print data therein.

Then, the CPU 1201 delivers the image data to the RIP 1250 via the image bus interface 1205. The RIP 1250 converts the image data (PDL code) to bitmap image data and sends the bitmap image data to the image compression section 1240. Upon receipt of the bitmap image data, the image compression section 1240 compresses the bitmap data and accumulates the compressed image data (compressed bitmap image data) in the HDD 1204.

Then, the CPU 1201 supplies the image data (compressed bitmap image data) accumulated in the HDD 1204 to the image compression section 1240 via the image bus interface 1205. The image compression section 1240 expands the supplied image data (compressed bitmap image data) and sends the expanded image data to the printer image processor 1270. The printer image processor 1270 performs correction, resolution conversion, etc. of the received image data according to the printer section 30 and sends the processed image data to the image rotation section 1230. The image rotation section 1230 rotates the received image data as required.

Then, the CPU 1201 sends the image data having undergone various kinds of processing to the printer section 30, as print data, via the device interface 1220. The printer section 30 performs print processing on a sheet based on the received image data.

Note that although described in detail hereinafter, even during execution of the above-described print job, the printer section 30 acquires measured values from the electric power measurement section 50 at predetermined time intervals and calculates the amount of power consumption, and hence is capable of sending the result of the calculation in response to a request from the controller 1200.

Figure 4:
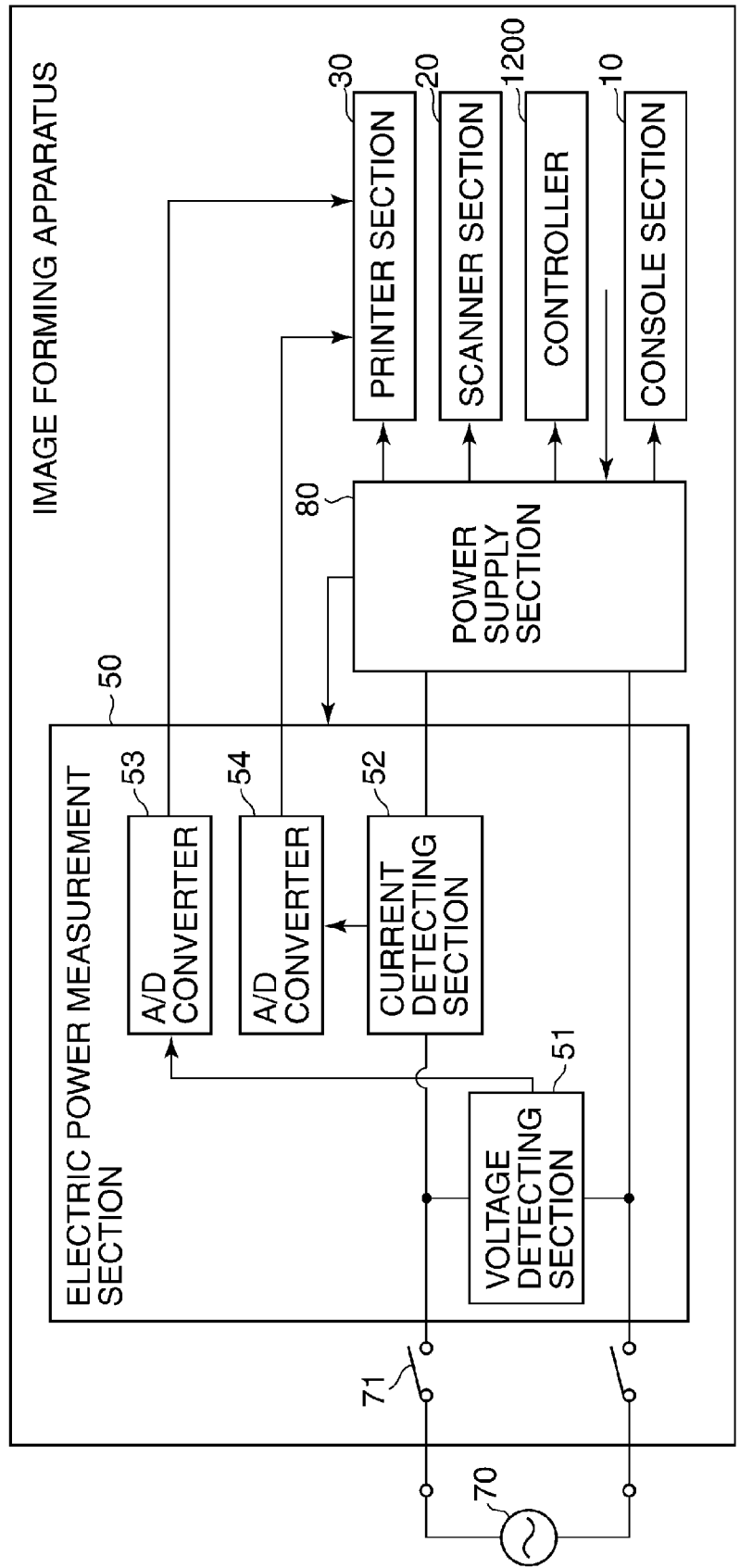
FIG. 4 is a block diagram of an electric power measurement section of the image forming apparatus shown in FIG. 2.

Next, a description will be given, with reference to FIG. 4, of a configuration for supplying electric power within the image forming apparatus 100 of the present embodiment and the arrangement of the electric power measurement section 50.

In the image forming apparatus 100, a commercial power supply 70 is connected to a power supply section 80 via a main power switch 71 and the electric power measurement section 50. The power supply section 80 supplies electric power generated therein based on the commercial power supply 70 to the scanner section 20, the printer section 30, the electric power measurement section 50, the controller 1200, the console section 10, and other sections of the image forming apparatus 100.

Next, the electric power measurement section 50 will be described in more detail with reference to FIG. 4.

In the electric power measurement section 50 of the image forming apparatus 100, there are provided a voltage detecting section 51 and a current detecting section 52, and the voltage detecting section 51 and the current detecting section 52 read a voltage value and a current value, respectively. In the case of detecting a voltage, it is possible to employ e.g. a method in which currents flowing through a live line and a neutral line of the general commercial power supply are subjected to full-wave rectification, the voltage between the rectified currents is lowered e.g. by a power transformer, and then, a value of the resulting voltage is read by an analog-to-digital converter 53. Further, in the case of detecting a current, it is possible to convert a value of current flowing through the live line to magnetic flux, then convert the magnetic flux to voltage, and read the voltage by an analog-to-digital converter 54 to thereby detect the value of the current, or to read the value of current by inserting a current value detection resistor between the live line and the neutral line. Alternatively, a value of the current may be read by inserting an element that has its temperature changed by electric current flowing through. Levels of a voltage and an electric current detected by one of the above-mentioned methods and subjected to analog-to-digital conversion are input to the printer section 30, and the amount of power consumption is calculated within the printer section 30.

The image forming apparatus 100 can employ another method for calculation of the amount of power consumption. For example, the image forming apparatus 100 may be configured such that the electric power measurement section 50 incorporates a DPS (digital signal processor) that performs high-speed arithmetic computation of digital data and internally calculates the amount of power consumption. In this case, the electric power measurement section 50 may be directly connected to the controller 1200 via the internal communication interface 1208.

Next, a detailed description will be given of a power consumption amount calculation process executed in the image forming apparatus 100 for calculating the amount of electric power consumed by the printer section 30.

The voltage level and the current level detected and subjected to analog-to-digital conversion in the electric power measurement section 50 are input to the printer section 30. Then, the CPU 3001 of the printer section 30 reads the voltage level and the current level and stores a result obtained by multiplying the two values in the printer section 30, as power consumption (instantaneous power consumption value). The printer section 30 communicates with the internal communication interface 1208 in the controller 1200, whereby the power consumption thus calculated is sent to the CPU 1201 of the controller 1200.

Further, the CPU 3001 detects a time period having elapsed after an immediately preceding reading time and performs the calculation of power consumption value x time to thereby calculate a power consumption amount within a predetermined time period. The CPU 3001 of the printer section 30 cumulatively calculates the power consumption amount several times at time intervals of the predetermined time, and stores the cumulatively calculated power consumption amount, i.e. the total sum of power consumption amounts calculated thus far, in the printer section 30. When a request for a power measurement value is received from the controller 1200 via the internal communication interface 1208, the CPU 3001 notifies the controller 1200 of the cumulatively calculated power consumption amount and then clears the cumulatively calculated power consumption amount stored in the printer section 30.

In the image forming apparatus 100, the CPU 3001 performs the above-described processing, whereby the power consumption amount can be efficiently notified to the controller 1200 according to a request from the controller 1200 at predetermined time intervals.

Note that a reading interval for reading of an output value from the electric power measurement section 50 by the printer section 30, which corresponds to a calculation interval for calculation of a power consumption amount by the printer section 30, can be set as desired within a range where the above-mentioned print job or another print process is not adversely influenced.

Figure 5:
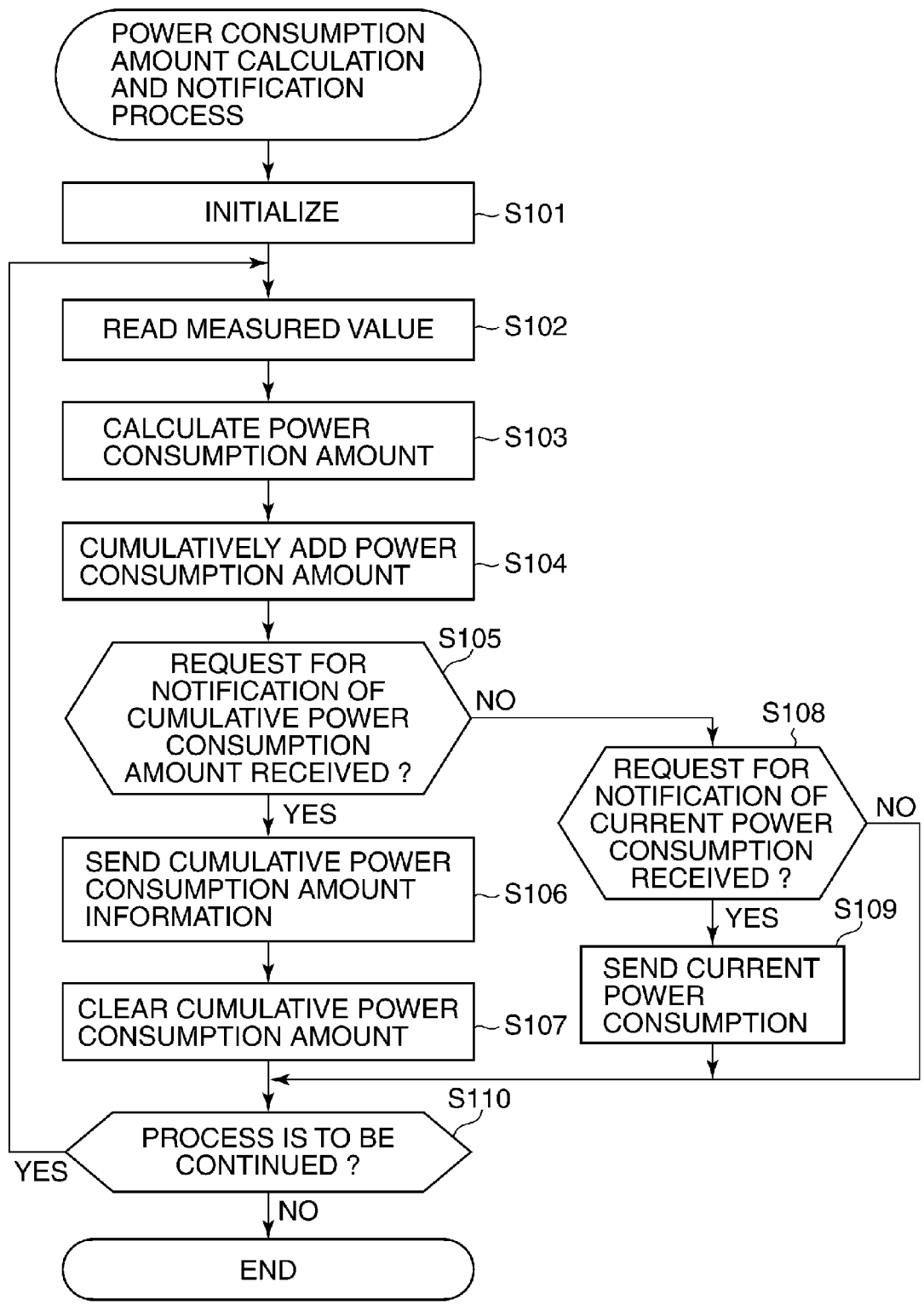
FIG. 5 is a flowchart of a power consumption amount calculation and notification process for calculating and notifying a power consumption amount.

Next, a description will be given, with reference to FIG. 5, of a power consumption amount calculation and notification process executed by the CPU 3001 of the printer section 30 concerning the measurement of a power consumption amount in the image forming apparatus 100.

When the power switch of the image forming apparatus 100 is switched on, the CPU 3001 executes an initialization process (step S101). In the initialization process, it is assumed here that internally stored data of the amount of power consumption (cumulative power consumption amount, etc.) is initialized.

Then, the CPU 3001 reads measured values (step S102). The measured values here are a voltage level and a current level detected and subjected to analog-to-digital conversion in the electric power measurement section 50.

Next, the CPU 3001 calculates the power consumption amount (step S103). In this calculation, the power consumption amount is calculated using the measured values read in the step S102 and a time period having elapsed after the immediately preceding measured value reading. More specifically, the measured values of the voltage level and the current level are multiplied by each other to calculate a power consumption value, and then the power consumption value is multiplied by the elapsed time to thereby calculate the power consumption amount.

Then, the CPU 3001 performs control such that the power consumption amount calculated in the step S103 is cumulatively added up and internally stored (step S104). Specifically, the CPU 3001 adds the power consumption amount calculated this time to the immediately preceding cumulative power consumption amount (the immediately preceding power consumption amount itself in the case of the cumulative calculation being calculated for the first time). Then, the CPU 3001 repeatedly carries out this processing to thereby perform control such that the amount (cumulative power consumption amount) of power consumption cumulatively calculated over a cumulative elapsed time period is stored as information.

Then, the CPU 3001 determines whether or not a request has been received for notification of the cumulative power consumption amount internally stored in the step S104 (step S105). The notification request is from the CPU 1201 of the controller 1200. The CPU 1201 issues the request via the internal communication interface 1208. If the request has been received from the CPU 1201, the process proceeds to a step S106. On the other hand, if the request has not been received from the CPU 1201, the process proceeds to a step S108.

If it is determined that the request has been received (YES to the step S105), the CPU 3001 makes a response to the request from the CPU 1201 of the controller 1200 (step S106). Specifically, the CPU 3001 notifies the requestor of the internally stored cumulative power consumption amount via the internal communication interface 1208. The CPU 1201 of the controller 1200 having received the notification acquires information on the power consumption amount accumulated up to the time of issuing the request.

Then, the CPU 3001 clears the internally stored cumulative power consumption amount (step S107). The processing for clearing the power consumption amount is executed so as to start accumulation of the amount of power consumption anew after having notified the controller 1200 of the cumulative power consumption amount in the step S106.

On the other hand, if it is determined in the step S105 that the request has not been received (NO to the step S105), the CPU 3001 determines whether or not a request for notification of the current power consumption (instantaneous power consumption value) has been received (step S108). The notification request is from the CPU 1201 of the controller 1200. The CPU 1201 issues the request via the internal communication interface 1208. If the request has been received from the CPU 1201 (YES to the step S108), the process proceeds to a step S109. On the other hand, if the request has not been received from the CPU 1201 (NO to the step S108), the process proceeds to a step S110.

When the request is received from the CPU 1201 of the controller 1200, the CPU 3001 notifies the requestor of the current power consumption via the internal communication interface 1208 in response to the request. Thus, the CPU 1201 of the controller 1200 can obtain information on the current power consumption amount.

In the step S110, the CPU 3001 determines whether or not to continue the present process. If the present process is to be continued (YES to the step S110), the process returns to the step S102, and the CPU 3001 continuously executes the power consumption amount calculation and notification process. On the other hand, if the present process is not to be continued (NO to the step S110), the CPU 3001 terminates the power consumption amount calculation and notification process.

Figure 6:
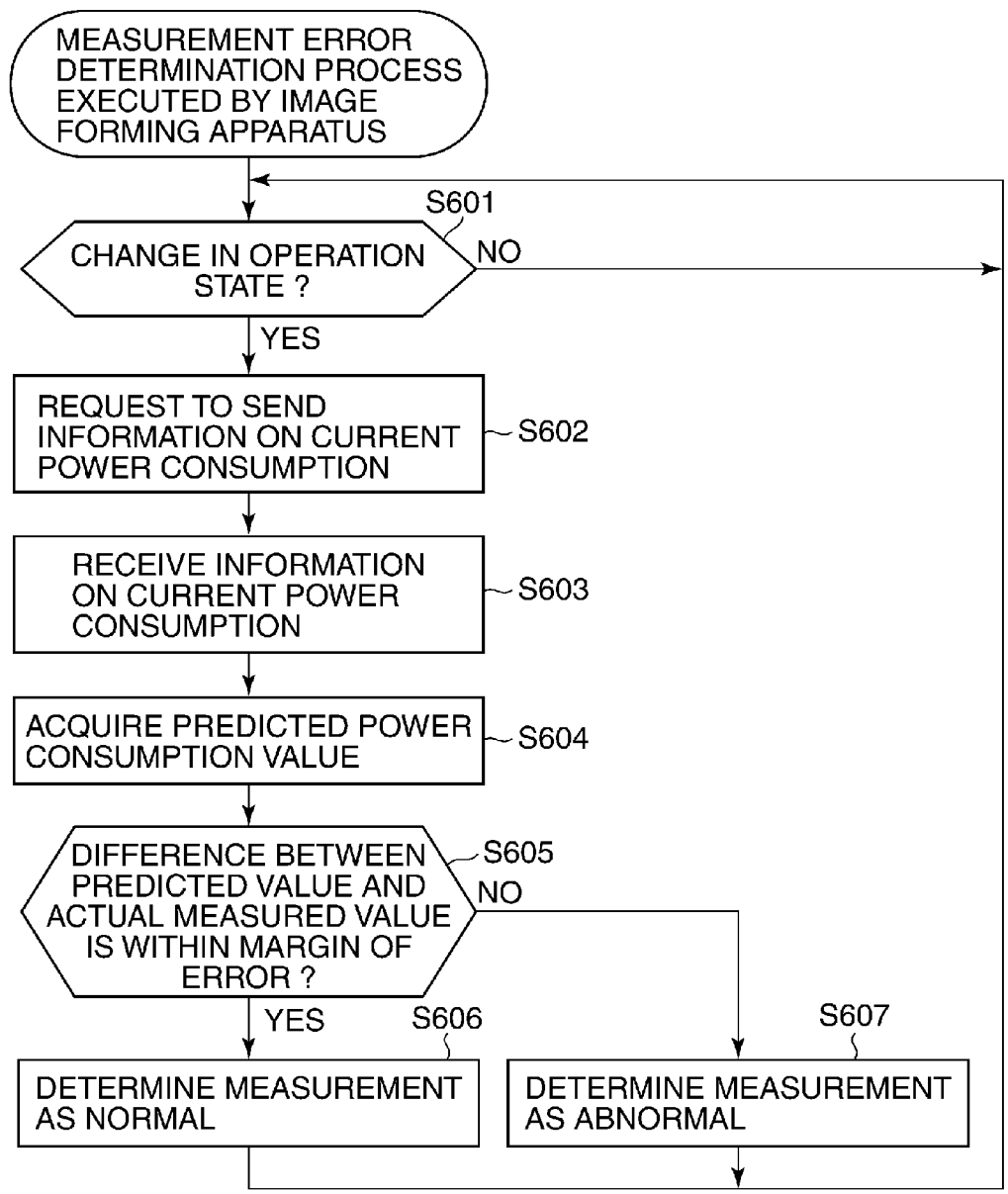
FIG. 6 is a flowchart of an error determination process for determining an error in the electric power measurement section.

Next, a description will be given, with reference to FIG. 6, of a measurement error determination process executed in the image forming apparatus 100. In the image forming apparatus 100, when the power consumption amount calculation process for calculating the amount of electric power consumed by the printer section is started, the CPU 1201 of the controller 1200 starts the measurement error determination process for determining an error in the electric power measurement section 50.

When the measurement error determination process is started, the CPU 1201 determines whether or not there is a change in the operation state of the image forming apparatus 100 (step S601). In the determination as to the change in the operation state, the CPU 1201 monitors whether the operation state of the image forming apparatus 100 has been changed from a standby state to a sleep state or vice versa, or whether the image forming apparatus 100 has started execution of a job received by job reception. Further, the CPU 1201 also monitors whether the image forming apparatus 100 has completed the job and entered the standby state, to thereby determine whether or not the operation state has been changed.

Then, the CPU 1201 requests the CPU 3001 of the printer section 30, via the internal communication interface 1208, to send information on the current power consumption (instantaneous power consumption value) (step S602). The CPU 1201 performs this requesting operation using the function of a measured power consumption amount acquisition section 1291 of a power consumption amount management program 1290, referred to hereinafter.

Next, the CPU 1201 receives the information on the current power consumption from the CPU 3001 of the printer section 30 via the internal communication interface 1208 and stores the information in the RAM 1202 (step S603). Then, the CPU 1201 acquires a predicted power consumption value from the HDD 1204 and stores the predicted value in the RAM 1202 (step S604). The predicted power consumption value is a typical value of power consumption, which was measured in advance when the operation state changed, i.e. a value of power consumption which was acquired in such timing the acquired value is indicative of typical power consumption in the operation state. Specifically, the predicted power consumption value corresponds e.g. to power consumption which will be measured during operation of the fixing device immediately after the start of a print job. Note that error information based on variation in timing at which the typical value is acquired is also added to the predicted power consumption value.

Next, the CPU 1201 makes a comparison between the current power consumption stored in the RAM 1202 and the predicted power consumption value (step S605). If the current power consumption is within a margin of error of the predicted power consumption value (YES to the step S605), the process proceeds to a step S606. On the other hand, if the current power consumption is out of the margin of error of the predicted power consumption value (NO to the step S605), the process proceeds to a step S607.

In the step S606, the CPU 1201 judges that the electric power measurement section 50 is normal in the current operation state, and stores the result of the error determination as "normal" in the RAM 1202 in association with the current operation state (step S606). On the other hand, in the step S607, the CPU 1201 judges that the electric power measurement section 50 is abnormal in the current operation state, and stores the result of the error determination as "abnormal" in the RAM 1202 in association with the current operation state.

Next, a description will be given of a case where the measurement error determination process is executed according to power consumption in an exemplary case illustrated in FIG. 7.

Figure 7:
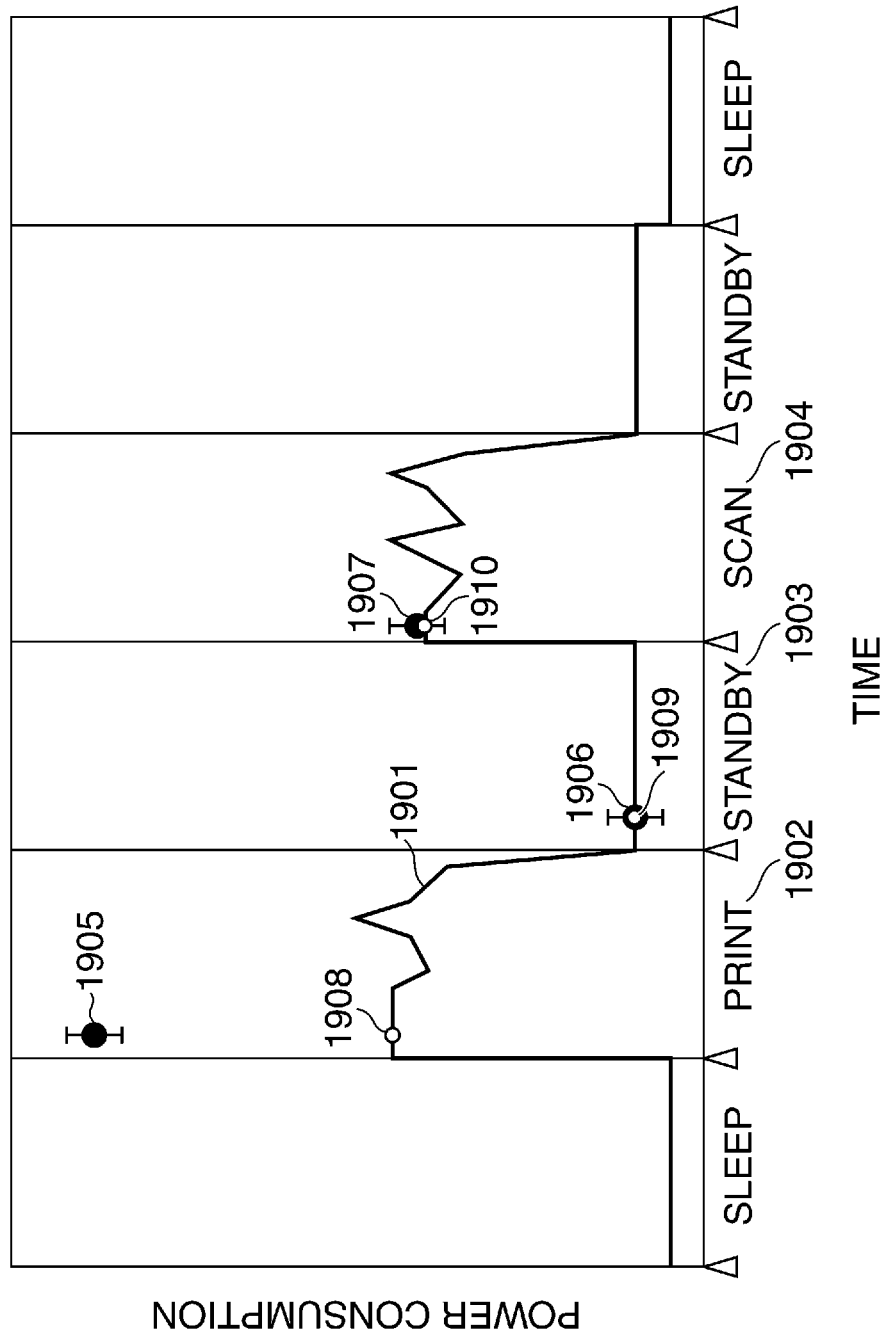
FIG. 7 is a diagram useful in explaining an example of transition of the amount of power consumption in the first embodiment.

FIG. 7 illustrates changes in the operation state and changes in power consumption in each operation mode. In FIG. 7, reference numeral 1901 denotes changes in power consumption. Reference numerals 1905 to 1907 denote predicted power consumption values in a print mode, a standby mode, and a scan mode, and margins of error of the respective predicted power consumption values. Further, reference numerals 1908 to 1910 denote respective instantaneous power consumption values as power consumption values corresponding to the respective state changes in the print mode, the standby mode, and the scan mode.

The measurement error determination process executed in the exemplary case in FIG. 7 is started in synchronism with the start of the power consumption amount calculation process for measuring the amount of electric power consumed by the printer section 30. In the print mode 1902 executed after the start of the power consumption amount calculation process, the CPU 1201 detects a change in the operation state (step S601). Then, the CPU 1201 checks whether or not the instantaneous power consumption value 1908 is within the margin of error of the predicted respective power consumption value 1905 (step S605). In the FIG. 7 case, the instantaneous power consumption value 1908 is not within the margin of error of the predicted respective power consumption value 1905 (NO to the step S605), and therefore the result of the error determination is stored as "abnormal" (step S607).

Then, in the standby mode 1903 in FIG. 7, the CPU 1201 detects a change in the operation state (step S601). After execution of the following steps described hereinbefore, the CPU 1201 checks whether or not the instantaneous power consumption value 1909 is within the margin of error of the predicted respective power consumption value 1906 (step S605). In the present case, the instantaneous power consumption value 1909 is within the margin of error of the predicted respective power consumption value 1906 (YES to the step S605), and therefore the result of the error determination is stored as "normal" (step S606).

Then, in the scan state 1904 in FIG. 7, the CPU 1201 detects a change in the operation state (step S601). After execution of the following steps described hereinbefore, the CPU 1201 checks whether or not the instantaneous power consumption value 1910 is within the margin of error of the predicted respective power consumption value 1907 (step S605). In the present case, the instantaneous power consumption value 1910 is within the margin of error of the predicted respective power consumption value 1907 (YES to the step S605), and therefore the result of the error determination is stored as "normal" (step S606).

Figure 8:
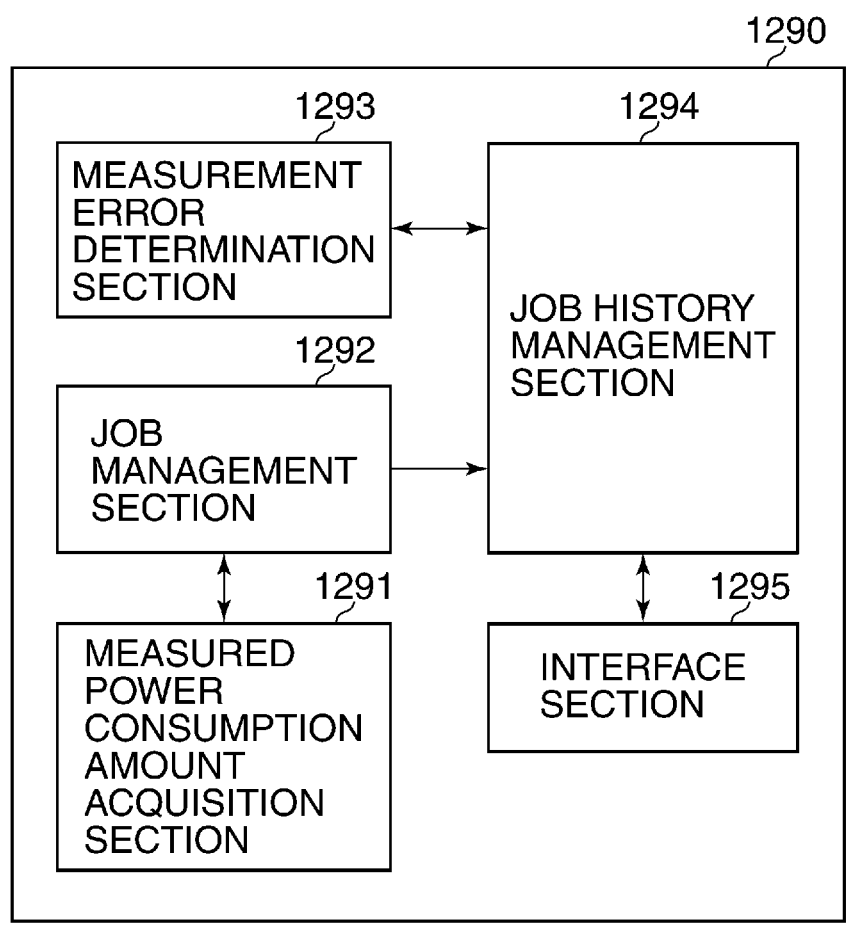
FIG. 8 is a diagram useful in explaining a power consumption amount management program executed by the image forming apparatus shown in FIG. 2.

Next, a description will be given, with reference to FIG. 8, of operation management control of the power consumption amount management program executed by the image forming apparatus. The power consumption amount management program 1290 illustrated in FIG. 8 is stored in the HDD 1204 together with job control programs for executing jobs, such as a print job and a copy job. The power consumption amount management program 1290 is read from the HDD 1204 into the RAM 1202 by the CPU 1201 when the CPU 1201 executes the boot program, and executed by the CPU 1201.

As shown in FIG. 8, the measured power consumption amount acquisition section 1291 of the power consumption amount management program 1290 requests the printer section 30, via the internal communication interface 1208, to send measured and internally stored power consumption amount or power consumption. Then, the measured power consumption amount acquisition section 1291 acquires the power consumption amount or the power consumption sent in response to the request. By issuing the request for the power consumption amount to the printer section 30 via the internal communication interface 1208 at a time of termination of a print job, the measured power consumption amount acquisition section 1291 can acquire the amount of electric power consumed for the job. Further, if the request for the power consumption amount is issued before the start of the following print job, the measured power consumption amount acquisition section 1291 can acquire the amount of electric power consumed between the jobs. Thus, the measured power consumption amount acquisition section 1291 can acquire current power consumption by making a request for information on power consumption.

A measurement error determination section 1293 of the power consumption amount management program 1290 determines whether or not the amount of power consumption has been normally measured by the electric power measurement section 50 through the above-described measurement error determination process. Measurement error can occur not only due to failure of the electric power measurement section 50, but it can also occur e.g. due to removal of the electric power measurement section 50 when the electric power measurement section 50 is removable.

Note that in the present embodiment, the cause of measurement error does not matter.

A job management section 1292 of the power consumption amount management program 1290 analyzes a print job or a copy job, to thereby acquire a user name, output attribute information including the number of copies, color printing, etc., the amount of power consumption, and so forth, and manages these as operation information. When operation information is on a job (e.g. a copy job) issued from the console section 10, the job management section 1292 acquires the same via the console section interface 1206. On the other hand, when operation information is on a job (e.g. a print job) issued from the client PC 110 or another external terminal apparatus, the job management section 1292 acquires the same via the network section 1210. In the case of managing operation information, the job management section 1292 acquires the amount of power consumption measured during associated job processing, using the measured power consumption amount acquisition section 1291. The job management section 1292 can also acquire the amount of power consumption measured between jobs. When the amount of power consumption measured between jobs is acquired, the job management section 1292 manages the information together with an operation state (the standby mode or the sleep mode) between the jobs in a form similar to that of the job operation information, whereby efficient management is achieved.

In the case of managing operation information, the job management section 1292 uses the measurement error determination section 1293 as well to thereby determine whether or not an acquired power consumption amount is normal (i.e. whether or not measurement error has occurred), and attaches the determination to the operation information. The job management section 1292 sends the thus managed operation information to a job history management section 1294.

The job history management section 1294 having received the operation information from the job management section 1292 stores the operation information received in timing synchronous with the start or termination of the associated job, in the form of an operation history information table.

The operation history information table stored in the job history management section 1294 is configured as illustrated by an example of an operation history information table in FIG. 9A, which is associated with the image forming apparatus 100, and by an example of an operation history information table in FIG. 9B, which is associated with the image forming apparatus 101. The power consumption management server 200 collectively manages these operation history information tables as separate tables.

An operation history record ID in an operation history record ID column 601 in the operation history information table illustrated in FIG. 9A or 9B uniquely identifies an operation history record associated with a job or the like. However, as described hereinabove, the power consumption management server 200 also collectively manages non-job operation states (the standby mode and the sleep mode) with efficiency.

A user name in a user name column 602 in the operation history information table indicates the name of a user who designated execution of a job. Note that a user name associated with a non-job operation state is represented as "non-user". An operation type in an operation type column 603 in the operation history information table indicates the type of an executed job. A print job, a copy job, or a scan job requested from the client PC 110 can be mentioned as examples of the executed job. The operation type also includes an operation state, such as "standby" or "sleep".

A start time in a start time column 604 and an end time in an end time column 605 in the operation history information table indicate the start time and the end time of an associated operation state (including a job), respectively. A color page count in a color page count column 606 indicates the number of pages printed or copied in color by an associated job. A monochrome page count in a monochrome page count column 607 indicates the number of pages printed or copied in monochrome by an associated job. A scanned page count in a scanned page count column 608 indicates the number of pages scanned by the scanner section 20. The scanned page count 608 may be divided e.g. into a color scanned page count column and a monochrome scanned page count column.

A power consumption amount in a power consumption amount column 609 in the operation history information table indicates the amount of electric power consumed by an associated operation. The power consumption amount column 609 also contains information indicating how much electric power (in watt-hours) was consumed in the sleep state or the standby state. A measurement error attribute in a measurement error attribute column 610 in the operation history information table indicates the result of determination as to whether or not the amount of electric power consumed by an associated operation was normally measured.

Based on the above-mentioned information items, the job history management section 1294 records job history information of what job was executed by whom, what time the job was started and terminated, and how much electric power (in watt-hours) was consumed for the job. For example, a record identified by an operation history record ID 1000 in the operation history record ID column 601 indicates execution of a copy job which was started at 2010/6/2__18:33 and terminated at 2010/6/2__18:50. Further, the record indicates that in the job, 10 pages were scanned, 10 pages were printed in color, and electric power of 100 watt-hours was consumed. Note that the operation history information table may be generated on a job-type basis.

The operation history information tables illustrated in FIGS. 9A and 9B also manage whether or not the amount of power consumption was normally measured. Taking FIG. 9A as an example, an operation history record identified by each of IDs 1000 to 1003 indicates that the amount of power consumption was normally measured. However, a record identified by each of operation history record IDs 1004 and 1005 indicates that the amount of power consumption was 0 watt-hours and hence the measurement error determination section 1293 determined that measurement error had occurred. Therefore, the measurement error attribute is recorded as 1 in both the cases. Note that measurement error is recorded when a measured power consumption amount is equal to 0 watt-hours or when acquisition of a power consumption amount is impossible due to removal of the electric power measurement section 50. A case can also be envisaged where a power consumption amount cannot be acquired due to no supply of electric power to the electric power measurement section 50. In the present embodiment, either when a measured power consumption amount is equal to 0 watt-hours or when a power consumption amount cannot be acquired from the electric power measurement section 50, the value "0" (watt-hours) is written in an associated table examples of which are illustrated in FIGS. 9A and 9B. An interface section 1295 of the power consumption amount management program 1290 displays the operation history information tables as operation information held in the job history management section 1294 on the liquid crystal operation panel 11 of the console section 10. Further, the interface section 1295 performs control for outputting the operation history information tables to the client PC 110 or another external apparatus connected to the LAN 3000, via the network section 1210.

Figure 10:
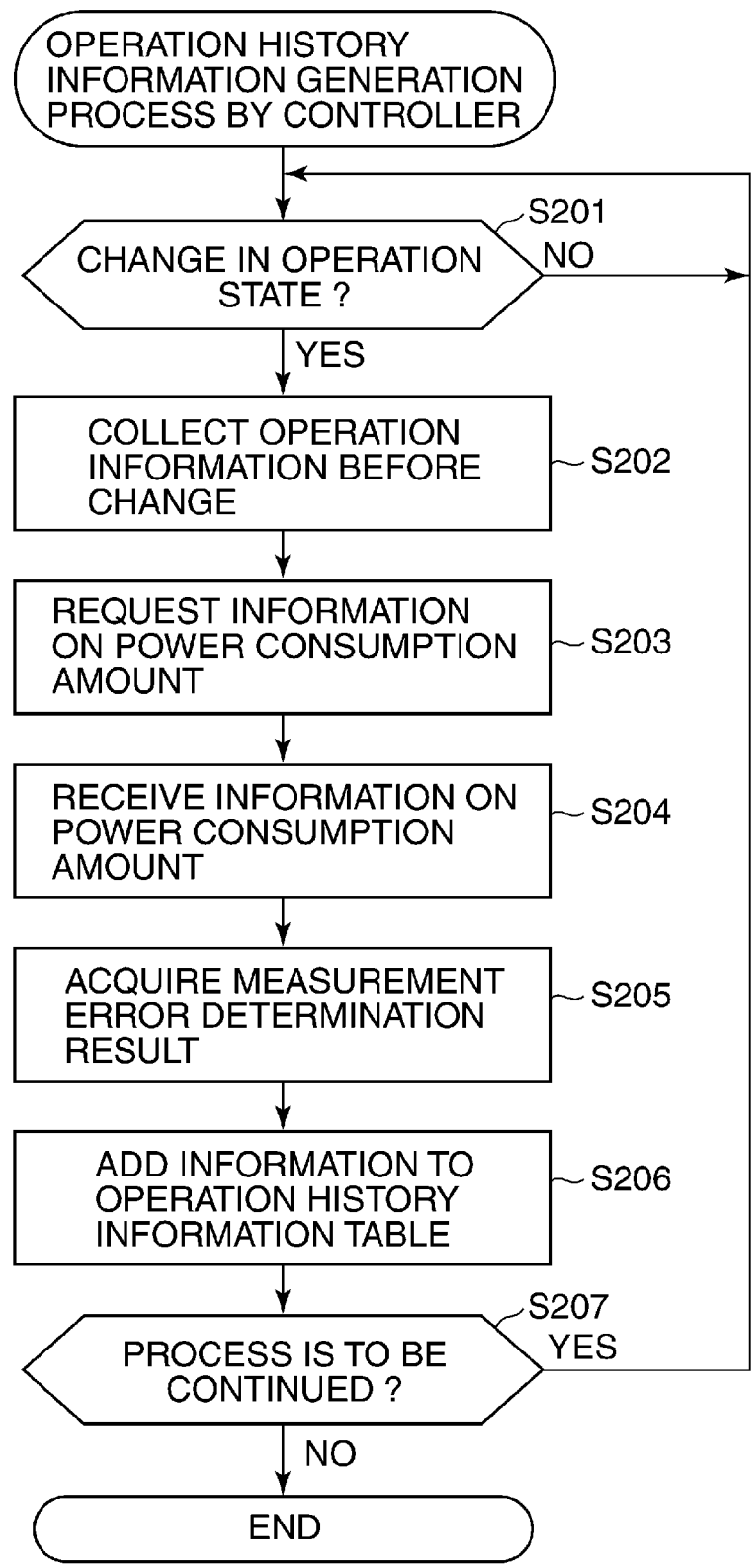
FIG. 10 is a flowchart of an operation history information generation process executed by a controller for generation of operation history information on the image forming apparatus shown in FIG. 2.

Next, a description will be given, with reference to FIG. 10, of an operation history information generation process executed by the CPU 1201 of the controller 1200 for generation of operation history information on the image forming apparatus 100. In the image forming apparatus 100, when the power consumption amount calculation process by the printer section 30 is started, the CPU 1201 of the controller 1200 starts the operation history information generation process.

The CPU 1201 determines whether or not the operation state has changed (step S201). The determination method used in this step is the same as that in the step S601, and therefore description thereof is omitted. The CPU 1201 waits until the operation state changes (NO to the step S201). When the CPU 1201 determines that the operation state has changed (YES to the step S201), the process proceeds to a step S202.

Then, the CPU 1201 collects information on a state before the change of the operation state detected in the step S201 (step S202). If the operation state before the change is "standby" or "sleep", the CPU 1201 acquires time period information indicative of how long the state lasted. On the other hand, if the operation state before the change is "job execution", the CPU 1201 acquires information concerning the job execution. Note that the CPU 1201 executes the present process using the function of the job management section 1292 of the power consumption amount management program 1290.

Then, the CPU 1201 requests the CPU 3001 of the printer section 30, via the internal communication interface 1208, to send internally stored information on the measured power consumption amount (step S203). The CPU 1201 makes this request using the function of the measured power consumption amount acquisition section 1291 of the power consumption amount management program 1290. Then, the CPU 1201 receives the information on the power consumption amount from the CPU 3001 of the printer section 30 via the internal communication interface 1208 and stores the information together with the operation state information, using the function of the job management section 1292 (step S204).

Then, the CPU 1201 acquires a result of determination as to whether or not the power consumption amount has been normally measured by the electric power measurement section 50 (step S205). The CPU 1201 acquires this determination result based on the result of measurement error determination performed by the measurement error determination section 1293. The acquired determination result is added to operation state information.

The CPU 1201 generates an operation history information table using the information acquired in the steps S202 to S205, and adds information to the operation history information table (step S206). More specifically, the CPU 1201 generates an operation history information table examples of which are illustrated in FIGS. 9A and 9B, using the function of the job history management section 1294 of the power consumption amount management program 1290. Further, when information on a changed operation state is generated, the CPU 1201 adds the information to the operation history information table.

Then, the CPU 1201 determines whether or not to continue the process (step S207). If the process is to be continued (YES to the step S207), the CPU 1201 returns to the step S201 and continuously executes the operation history information generation process. On the other hand, if the process is not to be continued (NO to the step S207), the CPU 1201 terminates the present operation history information generation process.

Next, a description will be given, with reference to FIG. 11, of the hardware configuration of the power consumption management server.

Figure 11:
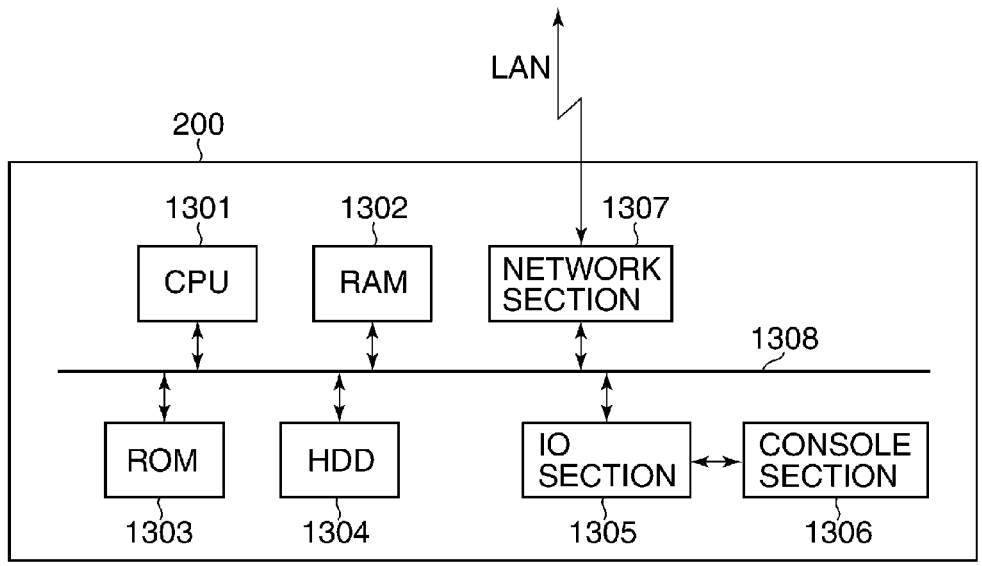
FIG. 11 is a block diagram of a power consumption management server appearing in FIG. 2.

As shown in FIG. 11, the power consumption management server 200 comprises a CPU 1301, a RAM 1302, a ROM 1303, a HDD (hard disk drive) 1304, a network section 1307, an IO section 1305, and a console section 1306, which are interconnected by a system bus 1308.

The CPU 1301 provides various functions by reading out programs, such as an OS (operating system) and application software, from the HDD 1304 and executing these. Further, the CPU 1301 performs centralized control of a power consumption management process executed by the power consumption management server 200.

The RAM 1302 is a system work memory used by the CPU 1301 during execution of each program. The ROM 1303 stores programs and configuration files for starting a BIOS (basic input output system) and the OS. The HDD 1304 stores system software and programs for realizing functions of the present embodiment including a power consumption amount management program 1340, described hereinafter. The power consumption amount management program 1340 is stored in a storage medium for distribution, or is downloaded from a predetermined server connected via the LAN 3000 and installed in the HDD 1304.

The network section 1307 is connected to the LAN 3000 for communication with (data transmission or reception to and from) external apparatuses, such as the client PCs 110 and 111 and the image forming apparatuses 100, 101, and 102. The IO section 1305 is an interface for inputting and outputting information from and to the console section 1306 comprising input and output devices, not shown, such as a liquid crystal display and a mouse. On the liquid crystal display, predetermined information is displayed in a predetermined number of colors at a predetermined resolution based on screen information designated by a program. For example, a GUI (graphical user interface) screen is formed, and various windows, data, and so forth required for operation are displayed on the GUI screen.

The power consumption management server 200 has the hardware configured as above, and each of the client PCs 110 and 111 is assumed to be similar in hardware configuration.

Figure 12:
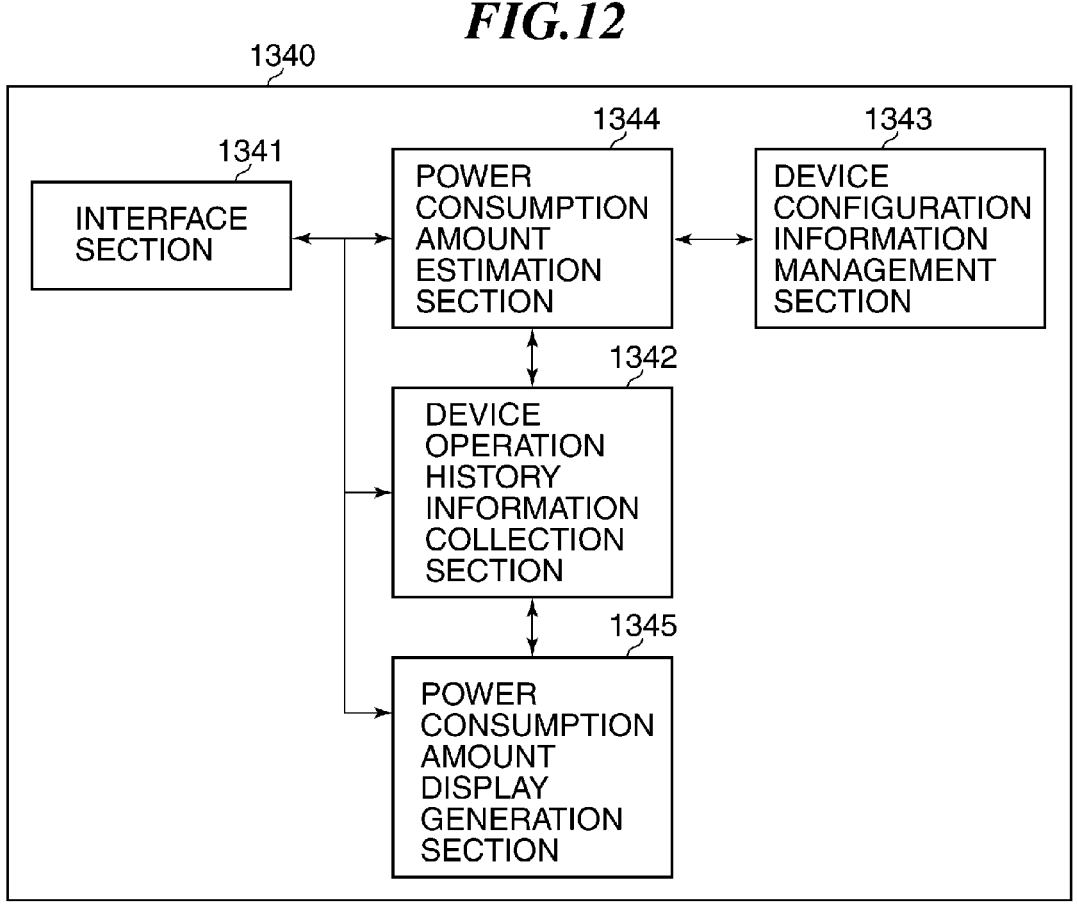
FIG. 12 is a functional block diagram of a power consumption amount management program executed by the image forming apparatus shown in FIG. 2.

Next, a description will be given, with reference to FIG. 12, of the power consumption amount management program 1340 executed by the power consumption management server 200.

The power consumption amount management program 1340 of the power consumption management server 200 is stored, as mentioned hereinabove, in the HDD 1304 for realizing functions of the server 200. The power consumption amount management program 1340 is read from the HDD 1304 into the RAM 1302 when the CPU 1301 executes the boot program. Then, the CPU 1301 executes the power consumption amount management program 1340 read out in the RAM 1302 to thereby execute the processing described hereafter.

An interface section 1341 of the power consumption management server 200 performs control for access to an external apparatus according to an instruction from a functional section referred to hereinafter. More specifically, the interface section 1341 performs control for access e.g. to the client PC 110 or 111 or the image forming apparatus 100, 101, or 102 connected to the LAN 3000, via the network section 1307. Further, the interface section 1341 causes the section 1305 to display power consumption amount information visualized in the form of a graph by a power consumption amount display generation section 1345 on the liquid crystal display of the console section 1306 or the like monitor.

A device operation history information collection section 1342 of the power consumption management server 200 collects operation history information on devices which are connected to the network and are subjected to power consumption management, via the interface section 1341, and manages the collected operation history information. In the present example, the devices correspond to the image forming apparatuses 100, 101, and 102. Further, the operation history information correspond to the operation history information table examples of which are illustrated in FIGS. 9A and 9B. Thus, operation history information including "job execution" of each image forming apparatus is collected in the power consumption management server 200, for management.

A device configuration information management section 1343 of the power consumption management server 200 manages information on the type and hardware configuration of each device and information on the amount of power consumption by each device. Note that the amount of power consumption entered in each of tables, described hereafter, which are managed by the device configuration information management section 1343 is an estimated value in watt-hours which is calculated based on an operation state and device information.

The device configuration information management section 1343 manages information in the form of a device configuration information table an example of which is illustrated in FIG. 13A. A device ID in an device ID column 701 uniquely identifies a device to be managed by the power consumption management server 200. In the present embodiment, the power consumption management server 200 manages the image forming apparatuses 100, 101, and 102 as shown in FIG. 13A. A date and time in an update time column 702 in the device configuration information table indicates a date and time when the device configuration of each apparatus was changed. An apparatus model ID in an apparatus model ID column 703 indicates the model of each of devices identified by respective apparatuses ID in the device ID column 701. In the present device configuration information table, the image forming apparatus 100 and the image forming apparatus 101 are assigned the same model ID A, which indicates that they are of the same model. On the other hand, the image forming apparatus 102 is assigned a model ID B, which indicates that the image forming apparatus 102 is different in model from the image forming apparatus 100 and the image forming apparatus 101. In each box of option columns 1 to 4 in the device configuration information table, there is registered information on hardware actually attached as an option to an associated one of the image forming apparatuses.

The present device configuration information table shows that each of the image forming apparatus 100 and the image forming apparatus 101 has a finisher X attached thereto as an option unit. Further, the device configuration information table shows that the image forming apparatus 102 has a finisher X and a sheet discharge unit Z attached thereto.

Next, a description will be given, with reference to FIG. 13B, of an option unit power consumption amount information table for managing the amount of electric power consumed by an option unit, which is managed by the device configuration information management section 1343. An option ID in an option ID column 711 in the option unit power consumption amount information table uniquely identifies an option unit. Reference numeral 712 in FIG. 13B denotes a "sheet size: A4" column which contains information on the amount of electric power consumed for A4 sheet printing, and reference numeral 713 denotes a "sheet size: A3" column which contains information on the amount of electric power consumed for A3 sheet printing.

Next, a description will be given, with reference to FIG. 13C, of a power consumption amount calculation correction information table managed by the device configuration information management section 1343 and containing power consumption amount calculation correction information on a job executed by each device. A device ID in an device ID column 721 in the power consumption amount calculation correction information table uniquely identifies a device to be managed by the power consumption management server 200. Reference numeral 722 in FIG. 13C denotes a column for containing data indicative of the amount of electric power to be consumed for printing a first page. Reference numeral 723 denotes a column for containing data indicative of the amount of electric power to be consumed for per color-printed page, and reference numeral 724 denotes a column for containing data indicative of the amount of electric power to be consumed per monochrome-printed page. Reference numeral 725 in FIG. 13C denotes a column for containing data indicative of the amount of electric power to be consumed per scanned page. Note that in the present embodiment, each value (power consumption amount) in the power consumption amount calculation correction information table reflects information in the FIG. 13A device configuration information table and the FIG. 13B option unit power consumption amount information table. More specifically, the model of a device (an image forming apparatus in the illustrated example), the option configuration associated with the device, and an increase in the amount of power consumption dependent the option configuration are obtained from FIGS. 13A and 13B, and then values in FIG. 13C are each calculated based on the values obtained from FIGS. 13A and 13B. For example, numerical values appearing in the respective columns 722 to 725 in FIG. 13C associated with the image forming apparatus 102 are obtained by adding a value indicative of the amount of electric power consumed by each of the finisher X and the sheet discharge unit Z to a power consumption amount by a power consumption amount associated with the model B, as a basis, which varies with the type of a job. Thus, appropriate power consumption amount calculation correction information is calculated in association with each of the devices.

Next, a description will be given, with reference to FIG. 13D, of a power consumption amount calculation information table managed by the device configuration information management section 1343 and containing power consumption amount calculation information in association with each operation state of each device.

A device ID in an device ID column 731 in the power consumption amount calculation information table uniquely identifies a device to be managed by the power consumption management server 200. Reference numeral 732 in FIG. 13D denotes a column for containing data indicative of electric power consumed per unit time when the operation state of each device is the standby mode, and reference numeral 733 denotes a column for containing data indicative of electric power consumed per unit time when the operation state is in a power-saving mode, such as the sleep mode. Further, reference numeral 734 in FIG. 13D denotes a column for containing data indicative of electric power consumed per unit time in a print job process, and reference numeral 735 denotes a column for containing data indicative of electric power consumed per unit time in a scan job process. In the present embodiment, it is assumed that in the case of performing facsimile transmission, the same power consumption amount information as on the scan job process in the column 735 is used. Further, in a job, such as a copy job, where scanning and printing are performed at the same time, a total value of a value in the "print job process" column 734 and an associated value in the "scan job process" column 735 is used as power consumption amount information. Each of the information tables in FIGS. 13A to 13D, including the present power consumption amount calculation information table, is not limited to the above-described configuration, but the column and row of the table can be flexibly set according to device specifications.

Next, a description will be given of a power consumption amount estimation section 1344 of the power consumption management server 200 shown in FIG. 12. The power consumption amount estimation section 1344 estimates the amount of power consumption by each device. Note that the estimation process is executed on an operation history record with its measurement error attribute set to 1. A measurement error is detected e.g. when the power consumption amount measurement section of a device is faulty or when the power consumption amount measurement section is disconnected. Further, a measurement error is also detected when a device that is originally not provided with a power consumption amount measurement mechanism sends an operation history record to the power consumption management server 200, with its measurement error attribute set to 1.

When a measurement error occurs, the power consumption amount estimation section 1344 complements the power consumption amount information. For this purpose, the power consumption amount estimation section 1344 analyzes an operation history record with its measurement error attribute set to 1, and then searches past operation history records each having a measurement error attribute of 0, for an operation history record containing a similar operation state to that of the analyzed operation history record. For example, when an operation history record sent from a device contains "a scanned page count of 1" and a measurement error attribute of 1, the power consumption amount estimation section 1344 searches operation history information on similar devices, for an operation history record (identified by an operation history record ID) containing "a scanned page count of 1" and a measurement error attribute of 0.

If such an operation history record is found, the power consumption amount estimation section 1344 substitutes power consumption amount information contained in the operation history record containing a measurement error attribute of 0 for power consumption amount information contained in the operation history record containing a measurement error attribute of 1. The similar devices mentioned here include not only a device identified by the same device ID in the device ID column 701 in FIG. 13A, but also a device or devices having the same device configuration, i.e. a device or devices different in device ID but belonging to the same model in the model ID column 703 with the same option configuration in the options 1 to 4.

If an operation history record containing the same operation state with a measurement error attribute of 0 is not found in the past operation history, estimating calculation of the power consumption amount is carried out using the power consumption amount calculation correction information table shown in FIG. 13C and the power consumption amount calculation information table shown in FIG. 13D. Note that e.g. in the case of a color print job, the estimating calculation is carried out following equations mentioned below. In the estimating calculation, an operation time period is calculated based on an end time in the end time column 605 and a start time in the start time column 604 in the operation history information table as shown in FIGS. 9A and 9B.

[operation processing time]=[end time]−[start time]

[estimated power consumption amount]=[a value of power consumption in the "print job process" column 734]×[operation processing time]+[a value of power consumption amount in "first-page printing" column 722]+[a value of power consumption amount in "color printing" column 723]×[color-printed page count]

The estimated power consumption amount calculated using the above equations is used as a substitute for the corresponding power consumption amount information in the operation history information table.

Further, when there is a change in the device configuration information table of devices shown in FIG. 13A, this sometimes causes a change in the power consumption amount information in the power consumption amount calculation correction information table shown in FIG. 13C as well. In this case, a date and time in the update time column 702 which indicates an actual change in the option configuration and a job start time in the operation history information table held in the device operation history information collection section 1342 are compared with each other, and if an operation history record containing a measurement error attribute of 1 is found in operation history records of the device after the updated date and time in the update time column 702, the estimating calculation of the power consumption amount is executed.

Figure 14:
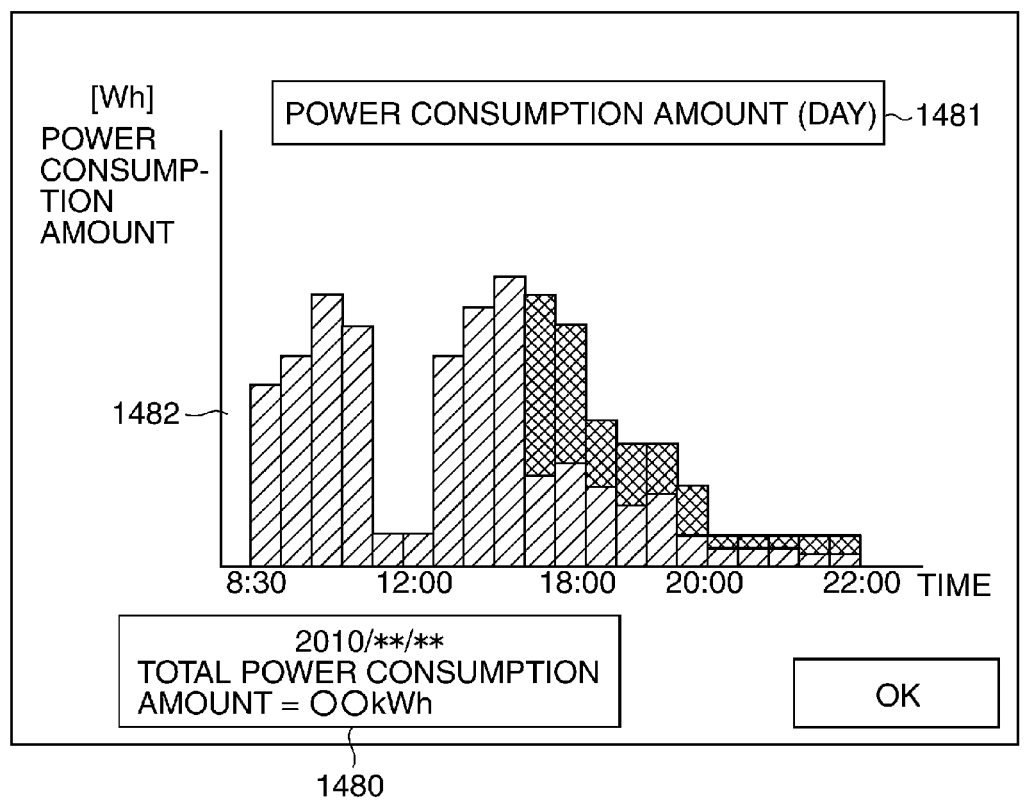
FIG. 14 is a view useful in explaining a display of the amount of power consumption, displayed in the power consumption amount management system according to the first embodiment.

Then, the power consumption amount display generation section 1345 visualizes information on the amount of power consumption by each device using a graph or the like, and displays the information on the liquid crystal display of the console section 1306 or the like monitor via the interface section 1341. FIG. 14 shows an example of an indication displayed on the monitor. In the example illustrated in FIG. 14, hatched portions of bars in a bar graph represent actual measurement-based power consumption amount information in which the measurement error attribute is 0, whereas cross-hatched portions of bars in the bar graph represent estimating calculation-based power consumption amount information in which the measurement error attribute is 1. The above-mentioned display processing is executed by an administrator managing the power consumption management server 200 by operating the console section 1306, whereby information on the amount of power consumption amount is displayed e.g. on the liquid crystal display.

Reference numeral 1481 in FIG. 14 denotes the title of displayed contents. In the FIG. 14 example, information on the amount of power consumption for one day is displayed in the form of a graph, and therefore the title 81 is displayed as "power consumption amount (day)". In FIG. 14, reference numeral 1480 denotes a total power consumption amount in a displayed time section. In the power consumption amount graph 1482 in FIG. 14, the amount of power consumption in a certain time section is displayed in the form of a graph in response to an instruction from the administrator. In the graph, the vertical axis represents the amount of power consumption per unit time, and the horizontal axis represents time.

The CPU 1301 having received a display request input by the administrator via the console section 1306 executes the display processing by executing the interface section 1341 and the power consumption amount display generation section 1345 of the power consumption amount management program 1340.

Although in the above-described embodiment, information is displayed on the liquid crystal display of the console section 1306 by the display processing, the information may be displayed on the display section of an external apparatus, such as the client PC 110 on the LAN 3000, via the network section 1307 in response to a request from the external apparatus.

Figure 15:
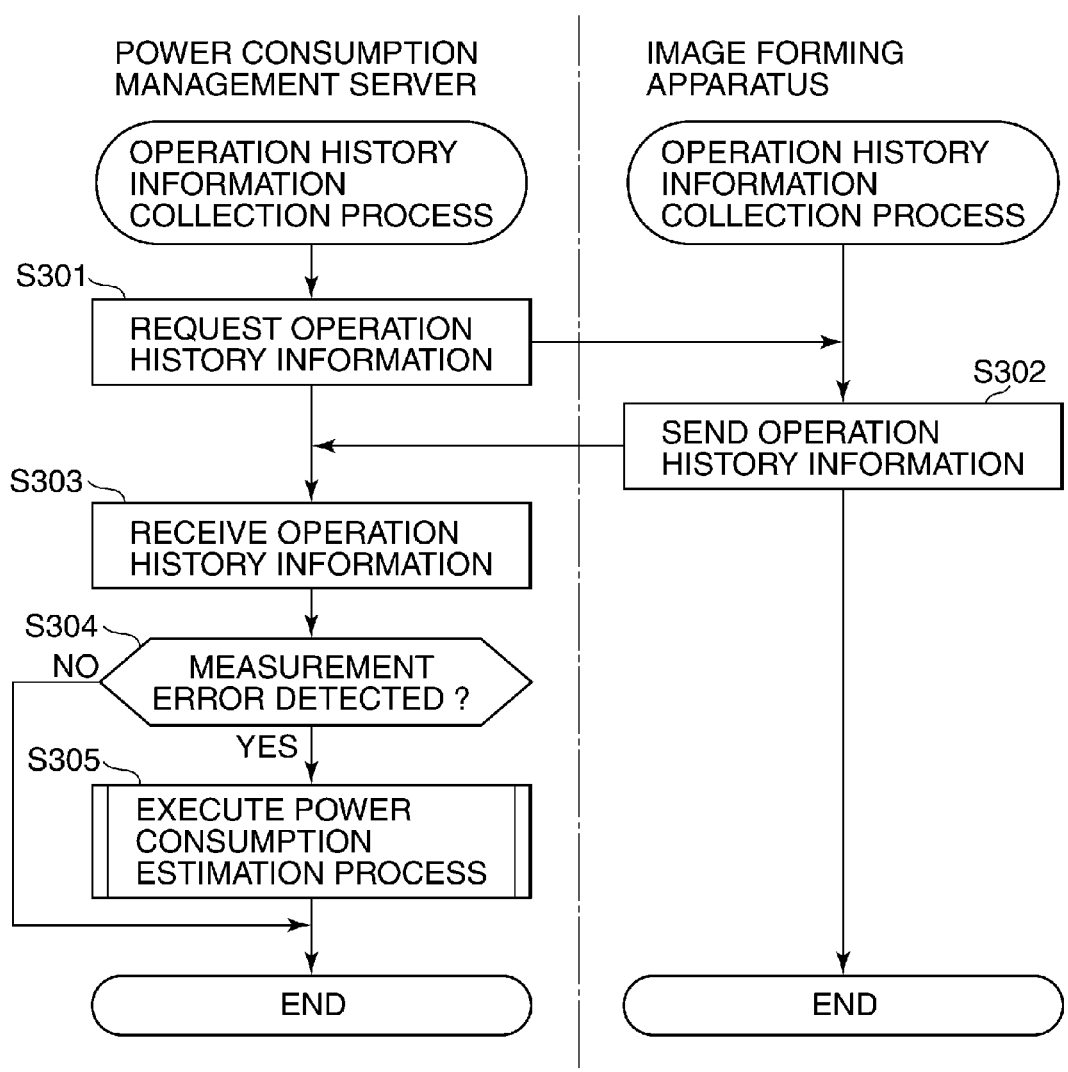
FIG. 15 is a flowchart of an operation history information collection process executed by the power consumption management server of the power consumption amount management system according to the first embodiment.

Next, a description will be given, with reference to FIG. 15, of an operation history information collection process executed by the CPU 1301 of the power consumption management server 200 for collecting operation history information on each device. In the present example, the devices mentioned here correspond to the image forming apparatuses 100, 101, and 102.

The CPU 1301 makes a request for operation history information (step S301). More specifically, the CPU 1301 requests each of the image forming apparatuses 100, 101, and 102, via the LAN 3000, to send operation history information. At this time, the CPU 1301 executes the device operation history information collection section 1342 of the power consumption amount management program 1340.

Then, in response to the request issued for operation history information made in the step S301, the CPU 1201 of each of the image forming apparatuses 100, 101, and 102 sends the operation history information via the network section 1210 (step S302). The operation history information mentioned here corresponds to the operation history information table examples of which are illustrated in FIGS. 9A and 9B. Note that each of the image forming apparatuses 100, 101, and 102 having once transmitted the operation history information transmits only differential information in the following loops.

The CPU 1301 of the power consumption management server 200 receives the operation history information from each of the image forming apparatuses 100, 101, and 102 via the LAN 3000 (step S303). The received operation history information is managed by the device operation history information collection section 1342 of the power consumption amount management program 1340.

Then, the CPU 1301 searches the operation history information table acquired in the step S303 for an operation history record with a measurement error attribute of 1 (step S304). If it is determined that there is no operation history record with a measurement error attribute of 1 (NO to the step S304), the present operation history information collection process is terminated, whereas if it is determined that there is an operation history with a measurement error attribute of 1 (YES to the step S304), the process proceeds to a step S305.

In the step S305, the CPU 1301 executes a power consumption amount estimation process on the operation history record with a measurement error attribute of 1 (step S305). The present power consumption amount estimation process is executed by the CPU 1301 executing the power consumption amount estimation section 1344 of the power consumption amount management program 1340. Thereafter, the CPU 1301 terminates the present operation history information collection process.

Figure 16:
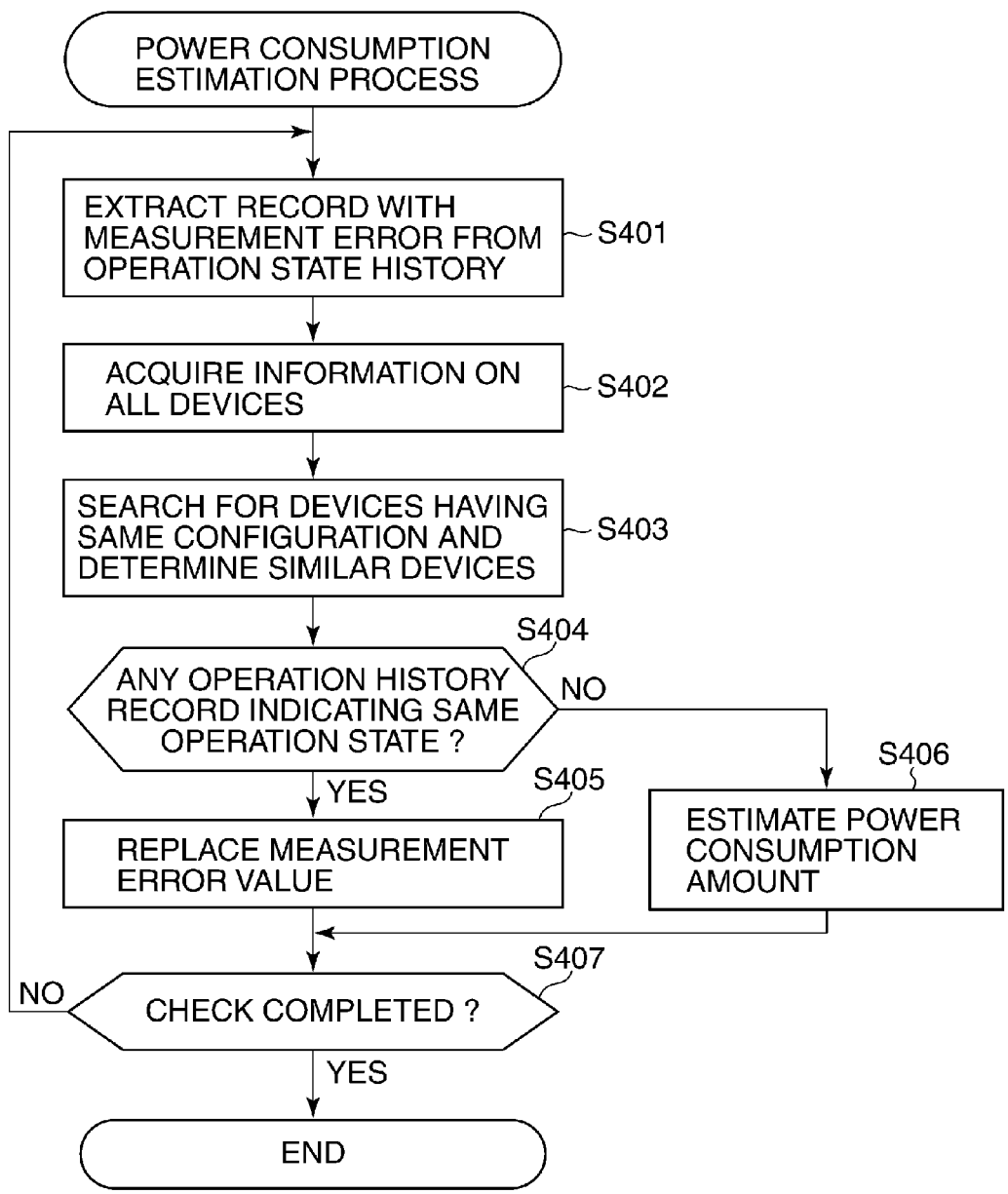
FIG. 16 is a flowchart of a power consumption amount estimation process executed in a step of the operation history information collection process shown in FIG. 15.

Next, a description will be given, with reference to FIG. 16, of the power consumption amount estimation process executed in the step S305 in FIG. 15.

When the power consumption amount estimation process is started, the CPU 1301 extracts an operation history record with a measurement error attribute of 1 from the operation history information table acquired from each of the devices (step S401). In the present example, for example, the CPU 1301 acquires the operation history information tables in FIGS. 9A and 9B e.g. from the respective image forming apparatuses 100 and 101 and makes use of them. Then, the CPU 1301 extracts an operation history record having an operation history record ID 1004 (or 1005) from the operation history information table acquired from the image forming apparatus 100, as an operation history record with a measurement error attribute of 1.

Next, the CPU 1301 acquires configuration information on all the devices on the LAN 3000, including configuration information on a device associated with the extracted operation history record with a measurement error attributes of 1 (step S402). More specifically, the CPU 1301 refers to all device configuration information managed by the device configuration information management section 1343 of the power consumption amount management program 1340 to thereby acquire the configuration information on all the devices. For example, the CPU 1301 acquires the configuration information on all the devices in FIGS. 13A to 13D. Note that the acquired configuration information may be stored in the RAM 1302, and be used in the following loops. In this case, this step S402 is skipped in the following loops.

Then, the CPU 1301 searches the device configuration information acquired in the step S402, for a similar device having the same device configuration as a device associated with an operation history record with a measurement error attribute of 1, to thereby determine similar devices, defined hereinabove (step S403). For example, in the case of the device configuration information table shown in FIG. 13A, the image forming apparatus 100 and the image forming apparatus 101 are identical to each other in the model ID and the option configuration, and hence the image forming apparatus 101 is found as a similar device having the same device configuration, whereby the image forming apparatus 100 and the image forming apparatus 101 are determined as the similar devices. Then, the process proceeds to a step S404.

Then, in the step S404, the CPU 1301 searches the operation history information tables associated with the similar devices determined in the step S403, for an operation history record indicating the same operation state as the operation state of the operation history record with a measurement error attribute of 1 to determine whether such an operation history record is found (step S404). This search is performed only on operation history records each having a measurement error attribute of 0 in the operation history information tables of the similar devices.

For example, in the case of the operation history information tables in FIGS. 9A and 9B, based on each of the operation history records with a measurement error attribute of 1, which have the operation history record ID 1004 (or 1005), the CPU 1301 first performs the search on operation history records with a measurement error attribute of 0 in the operation history information table containing a measurement error attribute of 1, i.e. in the illustrated example, on operation history records having respective operation history record IDs 1000 to 1003 in the operation history information table associated with the image forming apparatus 100. Further, the CPU 1301 performs the search on operation history records having the respective operation history record IDs 2000 to 2005 in the operation history information table associated with the image forming apparatus 101 having the same device configuration. As a result, with respect to the operation history record having the operation history record ID 1004, the CPU 1301 determines that there is no operation history record indicative of the same operation state with a measurement error attribute of 0. However, in a subsequent loop, with respect to the operation history record having the operation history record ID 1005, the CPU 1301 determines that the operation history record having the operation history record ID 1005 is an operation history record indicative of the same operation state with a measurement error attribute of 0, and extracts the same. At this time, when the operation type is "job", the CPU 1301 performs the determination as to whether an operation history record indicates the same operation state, based on the operation type and information contained in each of the columns from the color page count column 606 to the scanned page count column 608. When the operation type is "standby" or "sleep", the CPU 1301 performs the above-mentioned determination based on information on an operation time period determined by "end time-start time". Note that a criterion for the determination may be freely set by the administrator.

Referring again to FIG. 16, when the CPU 1301 determines that an operation history record indicative of the same operation state is found, and extracts the same (YES to the step S404), the process proceeds to a step S405. On the other hand, when the CPU 1301 determines that no operation history record indicative of the same operation state is found (NO to the step S404), the process proceeds to a step S406.

In the step S405, the CPU 1301 substitutes information of the power consumption amount in the operation history record extracted in the step S404 for the information on the power consumption amount in the operation history record with a measurement error attribute of 1 (step S405). For example, in the case of the operation history information tables in FIGS. 9A and 9B, the power consumption amount information of 500 watt-hours in the operation history record having the operation history record ID 2003 is substituted for the power consumption amount information of 0 watt-hours in the operation history record having the operation history record ID 1005. This makes it possible to use actual measurement-based power consumption amount information which is more reliable than a power consumption amount calculated by the estimating calculation equation. Note that the steps S405 and S406 are carried out by the CPU 1301 when executing the power consumption amount estimation section 1344 of the power consumption amount management program 1340.

On the other hand, in the step S406, the CPU 1301 determines information on the power consumption amount of the operation history record with a measurement error attribute of 1, by the estimating calculation. More specifically, the CPU 1301 calculates the power consumption amount by the estimating calculation, based on the device configuration information, illustrated in FIGS. 13C and 13D, which was acquired in the step S402. This processing is the same as the processing operation performed by the power consumption amount estimation section 1344 of the power consumption amount management program 1340.

Then, the CPU 1301 determines whether or not all of the operation history records have been checked for a measurement error (step S407). If not all the operation history records has been checked (NO to the step S407), the process returns to the step S401, and the CPU 1301 continuously executes the power consumption amount estimation process. On the other hand, if it is determined that all the operation history records have been checked (YES to the step S407), the power consumption amount estimation process is terminated.

Figure 17:
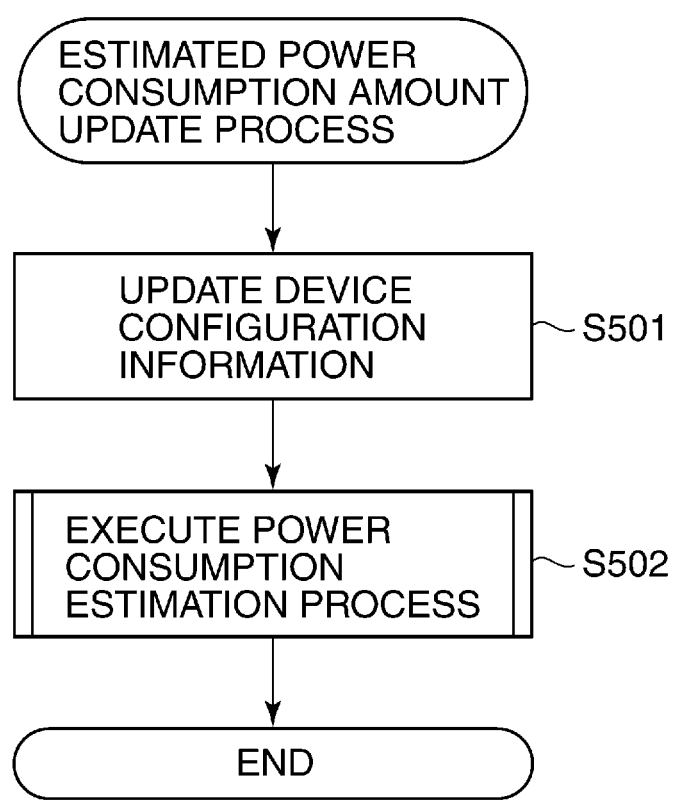
FIG. 17 is a flowchart of an estimated power consumption amount update process executed by the power consumption management server of the power consumption amount management system according to the first embodiment.

Next, a description will be given, with reference to FIG. 17, of an estimated power consumption amount update process executed in a case where there is a change in a device configuration information table or the like managed by the device configuration information management section 1343. The case where there is a change in a device configuration information table or the like is e.g. a case illustrated in FIG. 13A. When there is a change in the device configuration information table as shown in FIG. 13A, the power consumption amount information in the power consumption amount calculation correction information table is to be changed as illustrated in FIG. 13C. This change is made by the CPU 1301 of the power consumption management server 200 which executes the estimated power consumption amount update process. Note that the change in the device configuration includes a case where a sheet discharge unit Y is mounted as an option to the image forming apparatus 100, and when such a change has occurred, estimated values of power consumption amounts in related operations of the associated device appearing in the power consumption amount calculation correction information table shown in FIG. 13C are updated to more accurate values.

When the estimated power consumption amount update process of the power consumption management server 200 is started, the CPU 1301 updates the device configuration information according to data input by the administrator of the power consumption management server 200 (step S501).

In the present embodiment, a notification of change in the device configuration information may be received from a device via the LAN 3000, and the CPU 1301 may perform processing for automatically rewriting the configuration information without an instruction from the administrator. If such a change is executed, data in the update time column 702 is appropriately updated.

Then, the CPU 1301 executes a power consumption amount estimation process (step S502), followed by terminating the present estimated power consumption amount update process of the power consumption management server. The power consumption amount estimation process is similar to the power consumption amount estimation process shown in FIG. 16, and therefore description thereof is omitted. Note that in the present power consumption amount estimation process, the CPU 1301 refers to the update time column 702 in the device configuration information table in FIG. 13A, and re-executes the process only on operation history records (having respective operation history records ID) with a measurement error attribute of 1 after an update time in the update time column 702.

The power consumption management server 200 thus executes the estimated power consumption amount update process, whereby the estimated values of power consumption amounts in operation history records with a measurement error attribute of 1 can be always maintained as reliable values.

Next, a description will be given of a power consumption amount display process for displaying the amount of power consumption using estimated values obtained by estimating the power consumption amount when a device for measuring the amount of power consumption becomes unable to perform measurement, and actual measured values obtained by actually measuring the power consumption amount.

Figure 18A:
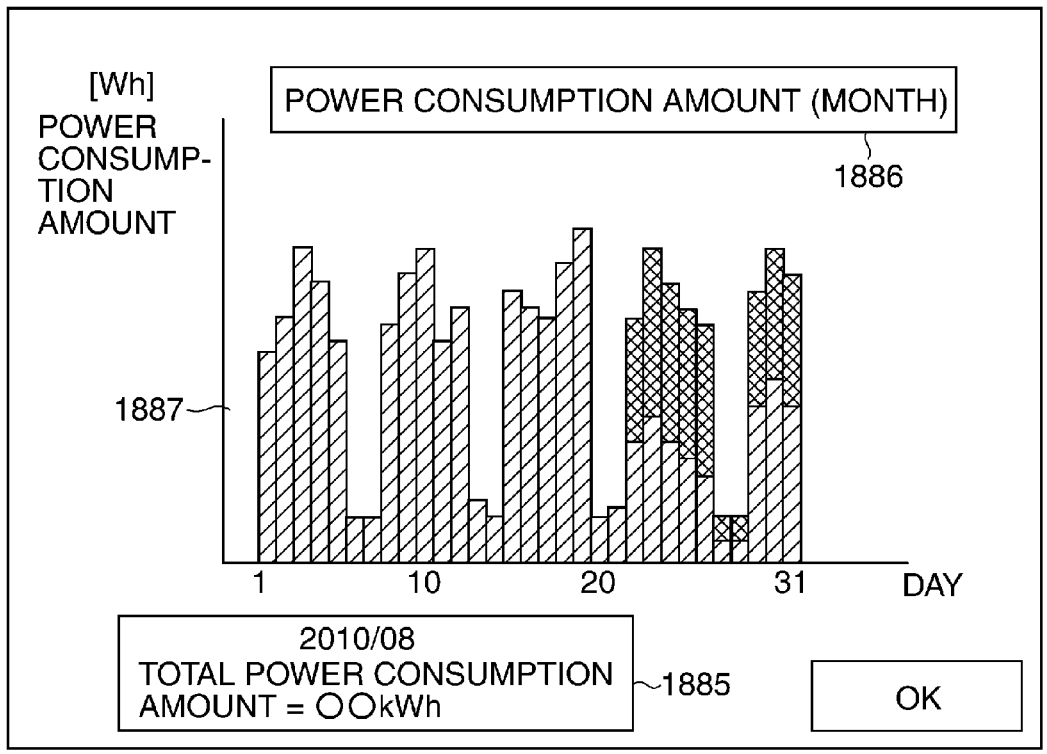
FIGS. 18A and 18B are views useful in explaining an example of changes in the display of the amount of power consumption, displayed in the power consumption amount management system according to the first embodiment.
Figure 18B:
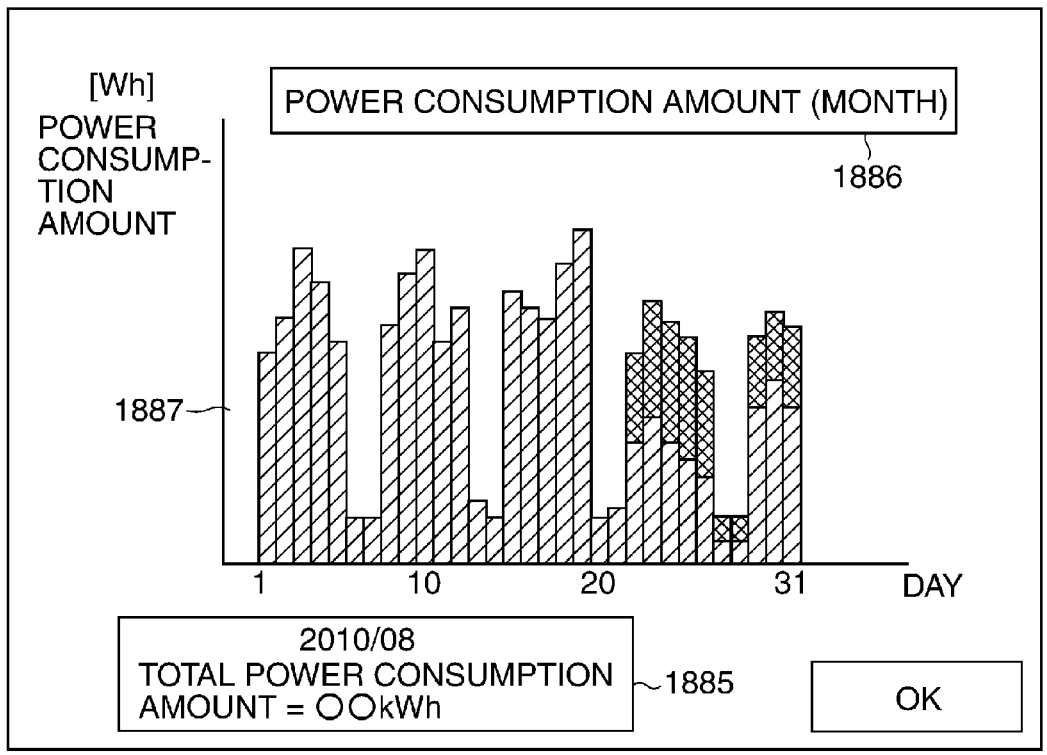

The CPU 1301 of the power consumption management server 200 executes the power consumption amount display process for displaying changes in the power consumption amount obtained by the estimated power consumption amount update process described with reference to FIG. 17 in the form of a graph examples of which are illustrated in FIGS. 18A and 18B. In the present process, the CPU 1301 executes the power consumption amount display generation section 1345 of the power consumption amount management program 1340 to thereby display the graph on the liquid crystal display of the console section 1306 via the interface section 1341.

In FIG. 18A, reference numeral 1886 denotes a title of displayed contents. In the case of the illustrated example of a power consumption amount graph 1887, in response to an instruction from the administrator, information on the amount of power consumption for one month is displayed in the form of a graph, and therefore the title 1886 is displayed as "power consumption amount (month)". Reference numeral 1885 denotes a total power consumption amount in a displayed time section. In the present example, the total amount of power consumption in August, 2010 is displayed.

In the power consumption amount graph 1887, the vertical axis represents the amount of power consumption per unit time, and the horizontal axis represents days (1st to 31st). In the graph 1887, hatched portions of bars thereof represent actual measurement-based power consumption amount information in which the measurement error attribute is 0, whereas crosshatched portions of bars in the graph represent estimating calculation-based power consumption amount information in which the measurement error attribute is 1.

In the example illustrated in FIG. 18A, the estimating calculation-based power consumption amount information in which the measurement error attribute is 1 is switchingly displayed in a section starting from the 22th of the month due to some cause, such as a failure of the power measurement section. When the device configuration information table in FIG. 13A, which are associated with the apparatuses, is changed in this state in September, 2010, the graph is changed as illustrated in FIG. 18B. For example, this case corresponds to a case where an update time in the update time column 702 is Aug. 20, 2010. More specifically, this case can be considered e.g. as a case where the option configuration was actually changed on Aug. 20, 2010, but the power consumption management server recognized this change in September in 2010.

When a device configuration information table is changed, the CPU 1301 of the power consumption management server 200 updates estimated values of power consumption amounts of operations of a device changed in device configuration, in the power consumption amount calculation correction information table shown in FIG. 13C, to more accurate values, and then executes the above-described power consumption amount display process. In this case, the graph changes as illustrated in FIG. 18B. The graph in FIG. 18B is basically the same as that in FIG. 18A, but power consumption amounts indicated by respective crosshatched portions are different from those in FIG. 18A. It can be understood from this that the estimating calculation-based power consumption amount information with a measurement error attribute of 1 has been changed to a more reliable value by update of the device configuration information table of the device. Thus, the administrator of the power consumption management server 200 can constantly obtain reliable information on the estimating calculation-based power consumption amounts even when a power consumption amount measurement error has occurred.

Next, a second embodiment of the present invention will be described with reference to drawings. The following description is basically given of points different from the first embodiment. In the second embodiment, the power consumption amount management program which is executed by the power consumption management server 200 in the first embodiment is executed in an image forming apparatus. This configuration makes it possible to realize the functions of the power consumption management server 200 by the image forming apparatus alone. In the case of realizing the power consumption management function within an image forming apparatus, the power consumption amount management program shown in FIG. 12 is recorded and stored in the HDD 1204 or the RAM 1202 of the image forming apparatus, and the CPU 1201 executes the power consumption amount management program.

The image forming apparatus is configured to display each of the indications illustrated in FIGS. 14 and 18A and 18B, respectively, on the screen (liquid crystal operation panel 11 in FIG. 3) of the console section 10, and receive an instruction input by a user.

Further, the image forming apparatus equipped with the power consumption management function is configured to be capable of managing not only the power consumption amount of the apparatus itself, but also the power consumption amount of each of other image forming apparatuses. Therefore, the present image forming apparatus is configured such that the user is capable of inputting necessary data in response to contents displayed on the console section 10 to thereby execute the power consumption management function.

Further, in the present embodiment, when it is determined that an actual measured value obtained by the electric power measurement section 50 is not within a margin of error (i.e. when measurement error has occurred), the actual measured value is replaced by an estimated power consumption amount. However, the estimated power consumption amount may be used not only when it is determined that a measurement error has occurred, but also when the electric power measurement section 50 has stopped its operation e.g. due to a shift of the operation state of the image forming apparatus to the sleep mode.

Further, in the present embodiment, a process for calculating an estimated power consumption amount associated with operation state information (e.g. operation history records of the operation history information table illustrated in FIG. 9A) having a measure error attribute of 1 added thereto is carried out by each image forming apparatus.

Each of the image forming apparatuses 100, 101, and 102 included in a power consumption amount management system according to the second embodiment is identical in hardware configuration to the image forming apparatus 100 described with reference to FIG. 2 in the first embodiment. Further, the console section and the electric power measurement section of the image forming apparatus in the present embodiment are identical in arrangement to the FIG. 3 console section and the FIG. 4 electric power measurement section in the first embodiment. The image forming apparatus in the present embodiment is different from the image forming apparatus included in the power consumption amount management system according to the first embodiment in respect of contents of the power consumption amount management program.

Next, the power consumption amount management program of the image forming apparatus in the second embodiment will be described with reference to FIG. 19.

Figure 19:
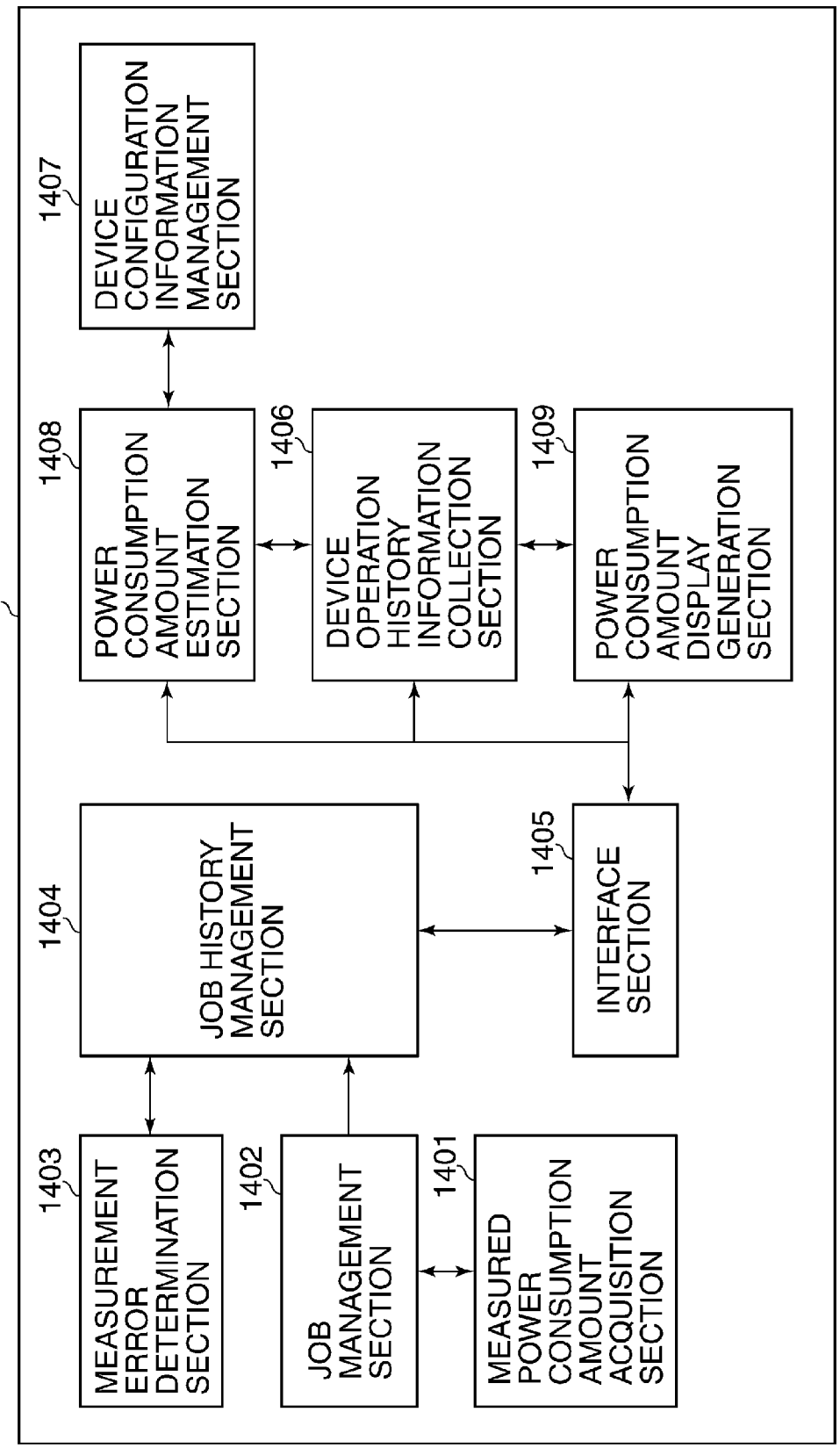
FIG. 19 is a block diagram showing a power consumption amount management program executed by an image forming apparatus of a power consumption amount management system according to a second embodiment of the present invention.

The power consumption amount management program 1400 shown in FIG. 19 includes sections ranging from a measured power consumption amount acquisition section 1401 to a job history management section 1404. These sections 1401 to 1404 are identical in function to the respective blocks 1291 to 1294 in the first embodiment.

An interface section 1405 in the second embodiment is configured to have both the function of the interface section 1295 and that of the interface section 1341 of the power consumption management server 200 in the first embodiment.

Sections ranging from a device operation history information collection section 1406 to a power consumption amount display generation section 1409 are identical in configuration to the device operation history information collection section 1342 to the power consumption amount display generation section 1345 of the power consumption management server 200.

The display function of the power consumption amount management program 1400 in the second embodiment displays information on the screen (liquid crystal operation panel 11 in FIG. 3) of the console section 10 of the image forming apparatus, similarly to the first embodiment. According to the second embodiment, with the above-described configuration, it is possible to realize the function of the power consumption management server 200 in an image forming apparatus.

In short, the device management system according to the present embodiment is formed as a network system that basically manages information on power consumption by each image forming apparatus. Therefore, in the present device management system, the image forming apparatuses 100, 101, and 102 and the power consumption management server 200 are interconnected via the network.

As described heretofore, according to the embodiments (particularly the first embodiment) of the present invention, Each of the image forming apparatuses 100, 101, and 102 as devices forming the device management system is provided with the electric power measurement section 50 incorporating the voltage detecting section 51 and the current detecting section 52, which serves as a power consumption amount measurement unit configured to measure the amount of power consumption.

Each of the image forming apparatuses 100, 101, and 102 is provided with the measurement error determination section 1293 as a measurement error determination unit configured to determine whether or not measurement of a power consumption amount by the electric power measurement section 50 is successful. The measurement error determination section 1293 makes a comparison between a power consumption value and a predicted power consumption value on an operation state basis. When the result of the comparison (difference) is not larger than a threshold value, the measurement error determination section 1293 determines that the measurement of power consumption is successful, whereas when the result of the comparison is larger than the threshold value, the measurement error determination section 1293 determines that the measurement of power consumption is unsuccessful.

Each of the image forming apparatuses 100, 101, and 102 acquires information on the amount of power consumption measured by the electric power measurement section 50, the result of measurement error determination performed by the measurement error determination section 1293, and job history information recorded on an operation history information table. The job history information contains operation history record IDs in the operation history record ID column 601, user names in the user name column 602, operation types in the operation type column 603, start times in the start time column 604, end times in the end time column 605, color page counts in the color page count column 606, monochrome page counts in the monochrome page count column 607, and scanned page counts in the scanned page count column 608.

In each of the image forming apparatuses 100, 101, and 102, an operation history information table having the job history information recorded therein is displayed on the liquid crystal operation panel 11 of the console section 10. At the same time, the information on the power consumption amount measured by the electric power measurement section 50 as a power consumption amount measurement unit is displayed on the liquid crystal operation panel 11 of the console section 10 as a power consumption amount display unit.

Further, each of the image forming apparatuses 100, 101, and 102 sends the information on the power consumption amount measured by the electric power measurement section 50 to the power consumption management server 200 via the interface section 1295 as a power consumption amount history notification unit. At the same time, the result of the measurement error determination performed by the measurement error determination section 1293 is sent to the power consumption management server 200 by the interface section 1295. The interface section 1295 displays, on the liquid crystal operation panel 11 of the console section 10, the operation history information table stored as operation information in the job history management section 1294. Further, the interface section 1295 displays the information on the power consumption amount measured by the electric power measurement section 50 on the liquid crystal operation panel 11 of the console section 10 as a power consumption amount display unit.

The power consumption management server 200 as a management apparatus is provided with the device operation history information collection section 1342 as a power consumption amount history reception unit configured to receive a notification sent from the interface section 1295 of the image forming apparatus 100.

Further, the management apparatus is provided with the power consumption amount estimation section 1344 as a power consumption amount information correction unit configured to refer to a measurement error determination result received from a device by the device operation history information collection section 1342, and correct the power consumption amount information on the device.

Further, the management apparatus is provided with the console section 1306 as a power consumption amount display unit configured to display the power consumption amount information received by the device operation history information collection section 1342, and the power consumption amount information corrected by the power consumption amount estimation section 1344.

Furthermore, the management apparatus is provided with the device configuration information management section 1343 as a device configuration information management unit configured to manage configuration information on each of the image forming apparatuses 100, 101, and 102.

In the management apparatus, the power consumption amount estimation section 1344 refers to the configuration information on each of the image forming apparatuses 100, 101, and 102 and refers to power consumption amount information on all of ones of the image forming apparatuses 100, 101, and 102, which are identical in configuration to an image forming apparatus suffering from a measurement error. Then, the power consumption amount estimation section 1344 substitutes power consumption amount information including a measurement error determination result indicating success in measurement, for power consumption amount information including a measurement error determination result indicating failure.

Further, this management apparatus may be configured such that when a change in device configuration is notified, the power consumption amount estimation section 1344 executes an estimating calculation process for estimating a power consumption amount and substitutes an estimated value for power consumption amount information including a measurement error determination result indicating failure.

The management apparatus may be configured such that the measurement error determination section 1293 makes a comparison between a power consumption value and a predicted power consumption value on a job operation state basis, and determines that power consumption measurement is successful, when the result of the comparison (difference) is not larger than a threshold value. In this case, when the result of the comparison is larger than the threshold value, the measurement error determination section 1293 determines that the power consumption measurement is unsuccessful.

According to the device management system configured as above, whenever each of the image forming apparatuses 100, 101, and 102 executes a job, a power consumption value and a predicted power consumption value are compared with each other.

When the result of the comparison is larger than the threshold value, the measurement error determination section 1293 of the image forming apparatus 100, 101, or 102 executing the job determines that the power consumption measurement is unsuccessful. Then, the image forming apparatuses 100, 101, or 102 notifies the power consumption management server 200 via the interface section 1295 that the power consumption measurement is unsuccessful.

In the management apparatus having received the notification of the failure in the power consumption measurement, the power consumption amount estimation section 1344 refers to the configuration information on the image forming apparatus and refers to power consumption amount information on all the image forming apparatuses identical in configuration. Then, the power consumption amount estimation section 1344 acquires power consumption amount information with the measurement error determination result indicating success in measurement, from the image forming apparatuses identical in configuration. Then, the power consumption amount estimation section 1344 substitutes the acquired power consumption amount information including a measurement error determination result indicating success in measurement, for power consumption amount information including a measurement error determination result indicating failure.

In the present device management system, even when any of the image forming apparatuses 100, 101, and 102 becomes unable to measure a power consumption amount therein, it is possible to appropriately estimate the power consumption amount and use the estimated value as a substitute for the power consumption amount. This makes it possible to improve reliability of power consumption amount information to thereby construct an appropriate power consumption amount management system.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-164431 filed Jul. 27, 2011, which is hereby incorporated by reference herein in its entirety.

What is claimed is:

1. A power consumption amount management system in which a device and a management apparatus for managing the device are connectable to a network, comprising:
   a measurement unit configured to measure a power consumption amount of the device;
   a determination unit configured to determine whether or not measurement of the power consumption amount by the measurement unit is successful;
   a notification unit configured to send notification of information on the power consumption amount measured by the measurement unit and a result of the determination performed by the determination unit to the management apparatus;
   a reception unit configured to receive the notification sent by the notification unit from the device; and
   a correction unit configured to correct the information on the power consumption amount by referring to the result of the determination received by the reception unit.

2. The power consumption amount management system according to claim 1, wherein the device is an image forming apparatus, and the notification sent by the notification unit contains job history information on jobs executed by the image forming apparatus.

3. The power consumption amount management system according to claim 1, further comprising a display unit configured to display the information on the power consumption amount measured by the measurement unit.

4. The power consumption amount management system according to claim 1, further comprising a display unit configured to display the information on the power consumption amount received by the reception unit and the information on the power consumption amount corrected by the correction unit.

5. The power consumption amount management system according to claim 1, further comprising a management unit configured to manage configuration information on the device.

6. The power consumption amount management system according to claim 5, wherein the correction unit refers to the configuration information managed by the management unit, refers to power consumption amount information on all devices identical in device configuration, and substitutes power consumption amount information including a result of the determination indicating success, for power consumption amount information including a result of the determination indicating failure.

7. The power consumption amount management system according to claim 1, wherein the correction unit executes an estimating calculation process for estimating a power consumption amount of the device, and substitutes an estimated value determined by the estimating calculation process for power consumption amount information including a result of the determination indicating failure.

8. The power consumption amount management system according to claim 1, wherein the determination unit makes a comparison between a power consumption value and a predicted power consumption value on an operation state basis, and when a result of the comparison is not larger than a threshold value, the determination unit determines that the measurement of the power consumption amount is successful, whereas when the result of the comparison is larger than the threshold value, the determination unit determines that the measurement of the power consumption amount is unsuccessful.

* * * * *